United States Patent [19]
Gerber

[11] Patent Number: 6,133,403
[45] Date of Patent: Oct. 17, 2000

[54] REACTIVE DILUENTS FOR ACID CURABLE PHENOLIC COMPOSITIONS

[75] Inventor: Arthur H. Gerber, Louisville, Ky.

[73] Assignee: Borden Chemical, Inc., Columbus, Ohio

[21] Appl. No.: 09/091,301

[22] PCT Filed: Dec. 23, 1996

[86] PCT No.: PCT/US96/20101

§ 371 Date: Oct. 7, 1998

§ 102(e) Date: Oct. 7, 1998

[87] PCT Pub. No.: WO97/24385

PCT Pub. Date: Jul. 10, 1997

[51] Int. Cl.$^7$ ..................................................... C08G 65/38
[52] U.S. Cl. ........................... 528/218; 528/86; 528/119; 528/176; 528/193; 528/486; 528/494; 528/495; 525/219; 525/534; 525/538; 524/128; 524/736
[58] Field of Search ..................................... 528/205, 208, 528/486, 254, 218, 86, 119, 176, 193, 494, 495; 524/736, 128; 525/219, 534, 538

[56] References Cited

U.S. PATENT DOCUMENTS

| | | |
|---|---|---|
| 2,568,384 | 9/1951 | Cheronis . |
| 3,725,333 | 4/1973 | Adkins et al. . |
| 4,122,054 | 10/1978 | Culbertson . |
| 4,157,324 | 6/1979 | Culbertson . |
| 4,302,380 | 11/1981 | Hesse et al. . |
| 4,314,925 | 2/1982 | Berazosky et al. . |
| 4,351,928 | 9/1982 | Smith . |
| 4,478,962 | 10/1984 | Woodson . |
| 4,481,310 | 11/1984 | Woodson . |
| 4,487,868 | 12/1984 | Armbruster et al. . |
| 4,587,291 | 5/1986 | Gardziella et al. . |
| 4,772,666 | 9/1988 | Just et al. . |
| 4,904,753 | 2/1990 | Watts et al. . |
| 4,961,795 | 10/1990 | Detlefsen et al. . |
| 5,032,642 | 7/1991 | Lemon et al. . |
| 5,200,455 | 4/1993 | Warren . |
| 5,243,015 | 9/1993 | Hutchings et al. . |
| 5,296,520 | 3/1994 | Gerber . |
| 5,317,050 | 5/1994 | Gerber . |
| 5,334,675 | 8/1994 | Gerber . |
| 5,340,888 | 8/1994 | Lemon et al. . |
| 5,378,793 | 1/1995 | Orpin . |
| 5,399,596 | 3/1995 | Kouge et al. . |
| 5,407,748 | 4/1995 | Fujibayahsi et al. . |

FOREIGN PATENT DOCUMENTS

| | | |
|---|---|---|
| 0343433 | 11/1989 | European Pat. Off. . |
| 0691377 | 1/1996 | European Pat. Off. . |
| 0553563 | 6/1932 | Germany . |
| 0316858 | 6/1930 | United Kingdom . |
| 1363227 | 8/1974 | United Kingdom . |

*Primary Examiner*—Duc Truong
*Attorney, Agent, or Firm*—Stevens, Davis, Miller & Mosher, LLP

[57] ABSTRACT

Disclosed are acid hardenable phenolic resin compositions and novolac compositions modified with about 5 to about 15% by weight of at least one reactive diluent selected from the group consisting of benzylic alcohol, benzylic ether, ethylene glycol, 1,3-butylene glycol, monoallyl or methylallyl ethers of poly(methylol) alkanes, monoallyl ether of glycerine, allyl or methallyl glycidyl ether, N-acylated arylamine, N-acylated naphthylamine, N-substituted arylsulfonamide, and N-substituted arylamine. The reactive diluent can be used to improve impact resistance and flexibility of the acid hardenable phenolic resin. Preferably, the methods for modifying mix life of acid hardenable phenolic resin by use of aryl phosphite and benzylic alcohol, and methods for modifying novolac resins, as well as methods for making the present compositions and products, such as coiled filament pipe and laminate panels, employing the compositions are also disclosed.

43 Claims, No Drawings

REACTIVE DILUENTS FOR ACID CURABLE PHENOLIC COMPOSITIONS

This is a national stage filing of Patent Cooperation Treaty application Ser. No. PCT/US96/20101 filed Dec. 23, 1996, and claims priority from U.S. provisional patent application Ser. No. 60/009,343, filed Dec. 27, 1995.

BACKGROUND OF THE INVENTION (a) Field of the Invention

This invention relates to employing reactive diluents, such as substituted or unsubstituted benzylic alcohol, preferably alkoxy benzyl alcohol or dibenzyl ether, together with resole resin and/or novolac resin hardening under acid catalysis.

(b) Description of the Prior Art

The hardening of phenolic resoles by the addition of strong acids is well known. Typical strong acids include the following: hydrochloric, sulphuric, phosphoric, trichloroacetic and sulphonic acids either alone or as mixtures thereof. Most often these acids are employed as aqueous solutions at concentrations varying from 20 to 85%. These hardeners normally cause the resoles to harden rapidly even at ambient temperatures of about 16° C. to about 30° C. As discussed below, hardening with strong acids has major limitations, i.e., they are difficult to control, they cannot easily afford extensive ambient temperature stability prior to hardening, they create corrosion problems, and they are very unstable when furfuryl alcohol, a desirable additive for phenolic resins, is employed with the phenolic resin.

According to U.S. Pat. No. 5,317,050 to Gerber, incorporated herein by reference in its entirety, it is known to employ aryl phosphite latent acid catalysts as an alternative to the strong acids. These latent acids provide controlled work time for hardening phenolic resins at ambient temperature and can provide extended work times at ambient temperatures. The phenolic resins are those which are hardenable by strong acids at ambient temperatures. Aryl phosphites are particularly effective hardening agents for both ambient temperature hardening or rapid hardening at relatively modest elevated temperatures, such as those of from about 50° C. to 100° C., or less, such as from 50° C. to 80° C.

U.S. Pat. No. 5,243,015 to Hutchings et al, incorporated herein by reference in its entirety, discloses a thermosetting phenolic resole resin composition, and process for its use, containing a latent catalyst in an amount adequate to cure the resole resin, upon application of heat, at a rate comparable to a rate of cure obtained with the resin using a conventional strong acid under comparable cure conditions. The latent catalyst comprises a salt of an amine selected from a primary amine, a secondary amine, or mixtures thereof, and a strong acid. Typically, the primary or secondary amine is selected from the group consisting of primary and secondary aliphatic, alicyclic, aromatic and heterocyclic amines. The strong acid is selected from the group consisting of sulfonic acids, organic acids and mineral acids. Typically, the sulfonic acid is selected from toluenesulfonic acid, xylenesulfonic acid, phenolsulfonic acid, methanesulfonic acid and mixtures thereof. Preferably, the strong acid has a pKa measured in an aqueous environment of less than about 3.0. Typical primary and secondary aliphatic amines include methylamine, ethylamine, propylamine, butylamine, dimethylamine and diethylamine, 1,3-diaminopropane, 1,2-diaminopropane, ethanolamine, ethylene diamine, butylene diamine, diethylene triamine, 1,2-diaminocyclohexane, cyclohexylamine, piperidine, pyrrolidine or piperazine.

In an alternate embodiment, the composition includes latent acid plus, as an additional ingredient, some strong acid catalyst typically in an amount which is insufficient by itself to cure resole resin at a commercially useful rate. Use of this lower amount of additional strong acid catalyst permits the composition to retain the extended pot life benefits associated with the latent catalyst, but allows the strong acid to act synergistically in combination with the latent catalyst to accelerate the cure rate of the resole resin dramatically.

U.S. Pat. No. 5,378,793 to Orpin, incorporated herein by reference in its entirety, discloses a hardener for producing phenolic resins from phenolic resoles which comprises a partial phosphate ester which is a latent acid. By partial phosphate ester is meant esters that are produced by reacting condensed phosphoric acids with polyols at strictly controlled temperatures with vigorous agitation under vacuum and with control of free acidity, i.e., until constant acidity values are attained. The partial phosphate ester may be used alone or blended with conventional acid hardener such as an aromatic sulphonic acid, e.g., p-toluene sulphonic acid. Use of such blends allows a wide range of variables to control the activity of the hardener and hence allows the optimization of the physical properties of the hardened resoles. Such hardener blends can then be added to phenolic resoles in an amount from 5–15% w/w, preferably from 5–10% w/w of the total formulation. Using such a formulation, it is possible to obtain bulk pot lives of between 30 minutes and 3 hours at ambient temperatures. However, if the temperature is from 60°–80° C., the pot lives will be in the range from 1–10 minutes. When used alone, the partial phosphate esters are provided in an amount sufficient upon hydrolysis to harden the phenolic resin.

The partial phosphate esters give a pot life of at least one hour at ambient temperatures to the resoles. This is sufficient time for the work-up procedures involved in normal preparation of reinforced phenolic resin composites. The partial phosphate esters act as delayed-action hardeners which allow greater flexibility in process control and minimize wastage of resoles due to premature gelation or hardening.

For certain end uses, e.g., for producing reinforced composites such as prepregs or filament windings impregnated with phenolic resins, phenolic resoles need to be hardened in the presence of reinforcing agents which are usually fibers whether woven or non-woven. Examples of woven fibers include those derived from polyamides, asbestos and glass, e.g., glass mats, or glass cloth. Examples of non-woven fibres include those derived from cellulosic fibers, glass and high molecular weight polyesters. After hardening, the reinforced composite comprising the phenolic resin and the reinforcing agent is then post-cured at about 80°–100° C.

Specific examples of processes, for manufacture of reinforced composites, include resin transfer molding (RTM), contact molding and pultrusion. Typical equipment for the manufacture of reinforced composites for filament winding, such as those referred to above, basically comprises a mandrel, an impregnation tank containing the phenolic resin and a hardener. The reinforcing agent, such as glass fibers, are immersed into the phenolic resin/hardener mixture in the tank to impregnate the reinforcing agent with the resin. After impregnation, the fibers are wound on a mandrel, cured and then removed from the mandrel.

In most processes associated with the production of wet resin based reinforced composites, the pot-life or gel-time of the resin being employed is critical in exercising control of the impregnation, cycling, hardening and curing stages of the process. In the case of resoles hardened by strong acids, pot-lives are short, typically of the order of 4–30 minutes, and the process has to be controlled by use of various expedients.

However, during the manufacture of these reinforced composites it is sometimes desirable to accelerate the rate of hardening of the phenolic resin. Thus, it would be desirable to provide additives which increase the rate of acid hardening when such an increase is desired as, for example, in high speed mold production lines.

Conventional resoles when cured, be it thermally or with acid, exhibit brittleness and poor impact resistance. This is a major drawback in many composite applications that use a liquid thermoset. Additives or technology that markedly improves impact resistance with little or no sacrifice in physical properties or fire-smoke-toxics (FST) behavior could accelerate the use of phenolics in composite applications. This represents a multi-billion dollar market with the major industry segments being transportation (about 31%), construction (about 20%), marine (about 13%), and corrosion (about 13%). Thus, it is also desirable to provide polymer products, especially composite materials, having high impact strength. This would provide products that would be rugged and durable. Thus, it would be desirable to provide additives for achieving such impact strength.

SUMMARY OF THE INVENTION

In one aspect, this invention provides an acid hardenable phenolic resin composition which is hardened in the presence of benzylic alcohols, preferably alkoxy benzyl alcohols and/or dibenzyl ethers.

In another aspect, this invention provides a method for acid hardening of phenolic resins in the presence of strong or latent acids and benzylic alcohols, preferably by use of alkoxy benzyl alcohols.

Additional aspects of the invention will become evident upon a reading of the specification and claims.

The compositions of the present invention include benzylic alcohol compounds of Formula I:

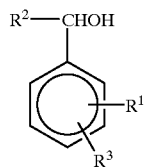

I can be employed in this invention for improving impact resistance and flexibility of the acid cured phenolic resole. $R^1$ is independently H, alkyl having 1 to 4 carbon atoms, or alkoxy having 1 to 4 carbon atoms. $R^2$ is H or alkyl having 1 to 4 carbon atoms, preferably $R^2$ is H or $CH_3$. $R^3$ may be selected from H, lower alkyl (preferably methyl), arylalkyl (such as benzyl), phenyl, and a moiety of formula —$OR^4$, which is alkoxy, wherein $R^4$ has 1–4 carbon atoms, or aryloxy wherein $R^4$ has 6 or 7 carbon atoms (preferably phenyl). $R^3$ may be either in the ortho, meta, or para position relative to the group —$CR^2HOH$.

Hardening rate may be increased by substituting $R^3$ as alkoxy or aryloxy at the ortho or para position for hydrogen. Hardening rate is especially increased where $R^3$ is alkoxy in the para position.

Benzylic alcohol derivatives, such as dibenzyl ethers are also effective reactive diluents.

The benzylic alcohol or benzylic alcohol derivatives may be used singly or in combination with the other modifiers, e.g., glycols, N-acylated arylamines, N-substituted arylsulfonamides, N-substituted arylamines or allyl compounds. Typical glycols include ethylene glycol or 1,3-butylene glycol. Typical N-acylated arylamines include acetanilide. Typical N-substituted arylsulfonamides include N-butyl benzenesulfonamide or N-hydroxylpropyl benzene sulfonamide. Typical N-substituted aryl amines include N-phenyldiethanolamine.

The compositions of this invention are particularly useful as high temperature resistant binders, to prepare products such as polymer (resin) concrete, refractory compositions such as castables, chemically resistant floor overlays, hand lay-ups/spray ups, prepreg materials, fiber composites, filament windings, coated and bonded abrasives, corrosion resistant pipes and panels, fire-retardant coated fibers, fabrics, or laminates. These products are typically made by processes such as press molding, pultrusion, resin transfer molding (RTM), the Seeman composite resin infusion molding process (SCRIMP), or reaction injection molding (RIM). Also, the compositions are useful for honeycomb structures and syntactic foam.

DETAILED DESCRIPTION OF THE INVENTION

The term room temperature is defined in this specification as temperatures of about 22° C. to 26° C. The term ambient temperature is defined as a temperature of about 16° C. to 30° C.

The term work time is the time after mixing of the composition during which the composition remains fluid or can be troweled, molded, etc. Also, work time is the period after mixing the composition during which the formation of a shaped article which is subsequently hardened does not show significant loss of density and strength in relation to shaping of such article immediately after mixing.

The terms hardening and curing are used interchangeably herein.

The term partially pre-solvolyzed, as it relates to the phosphites employed as latent acid catalysts, means that water, lower alkanol, lower glycol and/or benzylic alcohol has been mixed therein to cause reaction with the phosphite. After reaction, the mixture appears homogeneous in relation to any free water, alkanol, or glycol in the mixture. In case water is used for partially pre-solvolyzing the phosphite, the resulting product is referred to as partially pre-hydrolyzed.

The term total water content means the water in the resin as well as additional water in the composition which is available for reacting with and hydrolyzing the phenolic phosphite, e.g., moisture on the aggregate or water added to the composition which has not otherwise reacted to become unavailable for the hydrolysis reaction. Generally, all or most of the total water content will be supplied by the resin.

Benzylic Alcohol Reactive Diluents

One or more of the benzylic alcohol reactive diluents of the present invention are employed with acid catalyst for hardening phenolic resin. The catalyst may be strong acid catalyst and/or latent acid catalyst as described below. The phenolic resins may be resole resins, novolac resins or mixtures thereof, as described below. Preferably, the benzylic alcohol reactive diluents of the present invention, described in more detail below, result in products having improved impact strength relative to products made in the absence of the benzylic alcohol.

Unlike conventional plasticizers such as dibutyl phthalate or diisooctyl phthalate, which can be leached out in the presence of common organic solvents or may diffuse to the surface of the product, the benzyl moiety becomes chemically bonded to a phenolic nucleus and hence is unleachable. For example, benzyl alcohol and phenol, in the presence of aluminum chloride (an acid), give a mixture of 2-benzylphenol and 4-benzylphenol. Furthermore, the above conventional plasticizers are combustible and will reduce fire-retardancy. The aromatic group of the benzyl additive will have less impact on fire-retardancy of the cured phenolic resin.

The benzylic alcohol reactive diluents of the present invention have the following general Formula I:

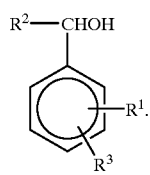

These compounds of Formula I can be employed to improve impact resistance and flexibility of the acid cured inner phenolic resole. $R^1$ is independently H, alkyl having 1 to 4 carbon atoms, or alkoxy having 1 to 4 carbon atoms. $R^2$ is H or alkyl having 1 to 4 carbon atoms, preferably H or $CH_3$. $R^3$ may be selected from H, alkyl having 1 to 4 carbon atoms (preferably methyl), arylalkyl (such as benzyl), phenyl, and a moiety of formula —$OR^4$, which is alkoxy wherein $R^4$ has 1–4 carbon atoms (preferably methyl), or aryloxy wherein $R^4$ has 6 or 7 carbon atoms (preferably phenyl). Preferably, $R^{1-4}$ are independently H or $CH_3$. More preferably, $R^1$ is H and $R^{2-4}$ are independently H or $CH_3$. $R^3$ may be either in the ortho, meta, or para position relative to the methylol group (—$CR^2HOH$). Such materials increase impact resistance of novolac or resole polymers. Typical benzylic alcohols include benzyl alcohol, α-methylbenzyl alcohol, veratryl alcohol (3,4-dimethoxybenzyl alcohol), or anisyl alcohol.

Employing alkoxy or aryloxy, instead of H, as $R^3$ at the ortho or para position increases hardening rate. Hardening rate is especially increased where $R^3$ is alkoxy in the para position. Thus, preferred compounds of the present invention are those of Formulas II or IIA:

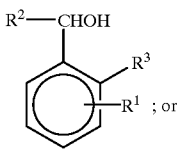

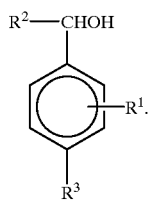

In Formulas II and IIA, $R^{1-2}$ are defined as in Formula I and $R^3$ is alkoxy or aryloxy as those terms are defined in Formula I. Most preferably, the benzylic alcohols of the present invention are those of Formula IIA, wherein $R^3$ is alkoxy or phenoxy. A preferred alkoxy benzyl alcohol is anisyl alcohol (also known as 4-methoxybenzyl alcohol)

wherein $R^{1-2}$ are each H and $R^3$ is $OCH_3$ in the para position as in Formula IIA.

Benzyl alcohol derivatives, such as dibenzyl ethers are also effective reactive diluents. These dibenzyl ethers have the following Formula III:

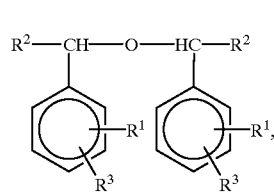

wherein each $R^1$, each $R^2$ and each $R^3$ are independently defined as in Formula I above. Most preferably, the dibenzyl ether is dibenzyl ether per se.

The benzyl alcohols or their derivatives are useful reactive diluents either singularly or in binary compositions with other reactive diluents.

The dibenzyl ethers have an advantage over benzyl alcohols in that they generate less water. Benzylic alcohols are theorized to benzylate (an alkylation) a phenolic nucleus with production of water as shown in the model equation (1):

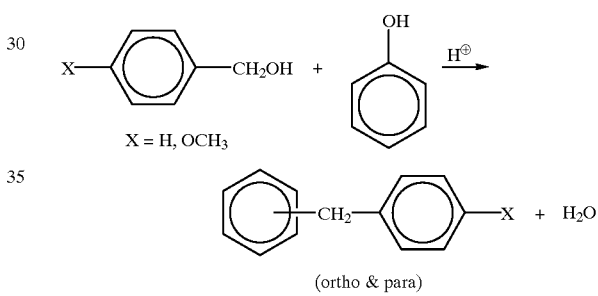

(Eq. 1)

In contrast, dibenzyl ether (also called benzyl ether) will produce ½ the amount of water as seen in equation (2):

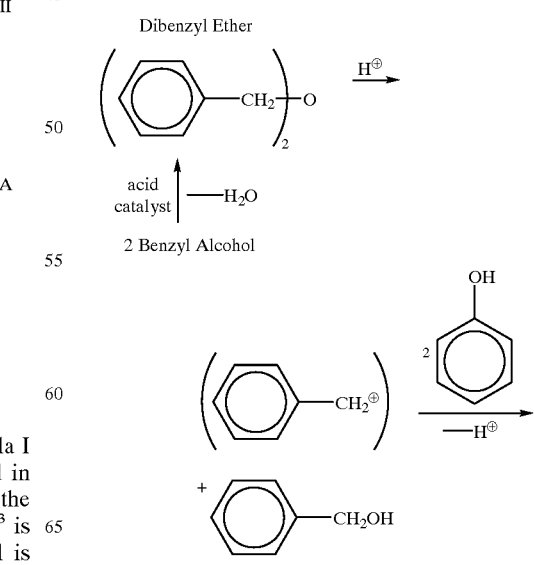

(Eq. 2)

-continued

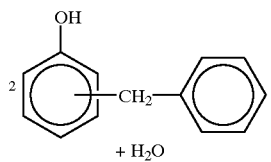

+ H₂O

The benzylic alcohol or benzylic alcohol derivative can be introduced into the hardenable composition in several ways. It can be added: (1) directly to the resin; (2) to the latent acid hardener; or (3) by a combination of (1) and (2).

When adding to the resin, the benzylic alcohol or benzylic alcohol derivative is added to the phenolic resin in amounts of about 3 to about 15 weight percent based on weight of phenolic resin, preferably about 5 to about 12 weight percent based on weight of phenolic resin.

Acid Hardeners

Latent acid hardening agents and additives that can be employed with the benzyl alcohols of the present invention include phosphite hardeners disclosed in U.S. Pat. Nos. 5,296,520, 5,317,050 and 5,334,675 all to Gerber, as well as other latent acid hardeners disclosed in U.S. Pat. No. 5,243, 015 to Hutchings et al (latent amine salts) and U.S. Pat. No. 5,378,793 to Orpin (partial phosphate esters), all incorporated herein by reference in their entirety.

Strong Acids

The typical strong acid catalysts include any of the mineral acids, such as phosphoric, sulfuric, sulfamic, and hydrochloric acids, organic acids, such as oxalic acid, maleic acid, or anhydrides such as maleic anhydride. Strong acids such as sulfuric, hydrochloric, phosphoric, phosphorous, benzenesulfonic, phenolsulfonic, toluenesulfonic, methanesulfonic, 2-acrylamido-2-methylpropanesulfonic, trihaloacetic, dihaloacetic, or sulfamic acids may be used alone or in combination with a latent acid. For example, diphenyl phosphite may be pre-reacted with 1 to 3% by weight of a 70% solution of benzenesulfonic, methanesulfonic, or phenolsulfonic acid to increase the hardening activity with a resole.

Aryl Phosphite Hardeners and Arylalkyl Phosphite Hardeners

The aryl phosphite hardeners, such as those of U.S. Pat. No. 5,317,050 to Gerber, as well as arylalkyl phosphite hardeners, are esters of phosphorous acid which have two aromatic organic ester groups and an acid hydrogen, three aromatic ester groups, or two aromatic ester groups and one alkyl group. Illustratively, the aryl phosphite hardener can be a disubstituted phosphorous acid ester such as diphenyl hydrogen phosphite or a phosphorous acid ester which is trisubstituted, such as triphenyl phosphite or diphenyl n-butyl phosphite.

In the presence of water, the aryl phosphites of this invention hydrolyze in a controllable manner over a period of time to stronger acidic products and eventually to phosphorous acid. Phosphorous acid is a strong acid having an ionization constant $pK_a$ of 1.20. Phosphorous acid is sufficiently acidic to provide room temperature hardening of phenolic resole resins. Illustratively, in the complete hydrolysis of one mole of diphenyl butyl phosphite, there would be produced one mole of phosphorous acid, one mole of butanol and two moles of phenol. The phenol which is split of the phosphite on hydrolysis acts as a reactive diluent in the subsequent hardening of the resin. Thus, it is noted that where the phosphites are the sole hardening agent, they are present in an amount sufficient on hydrolysis thereof to harden the resin.

The aryl phosphite hardening agents can be represented by the general Formula IV:

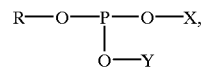

IV wherein each R and X is aryl, arylalkyl, O is oxygen, P is trivalent phosphorus, and Y is hydrogen, aryl, alkyl, or arylalkyl. Preferably, each aryl group has from 6 to 12 carbon atoms, particularly 6 to 7 carbon atoms, and the alkyl has from 1 to 12 carbon atoms, particularly about 1 to 8 carbon atoms. Illustratively, in the case of triphenyl phosphite, each of R, X, and Y of the above formula are phenyl. In the case of diphenyl hydrogen phosphite, R is phenyl, X is phenyl and Y is hydrogen. The aryl phosphites having two ester groups and a hydrogen atom, e.g., diphenyl hydrogen phosphite, are also referred to herein and in the literature as simply by the name of the ester groups and omit the hydrogen, e.g., diphenyl phosphate.

Illustrative of the aryl phosphite hardeners used in this invention there can be mentioned diphenyl hydrogen phosphite; dicresyl, preferably meta or para, hydrogen phosphite; phenyl p-cresyl hydrogen phosphite; phenyl m-cresyl hydrogen phosphite; dinaphthyl hydrogen phosphite; diphenyl isopropyl phosphite; diphenyl methyl phosphite, di(p-cresyl) n-hexyl phosphite, triphenyl phosphite, tri(m-cresyl) phosphite, diphenyl isooctyl phosphite, diphenyl 2-ethylhexyl phosphite, diphenyl isodecyl phosphite, diphenyl cyclohexyl phosphite, 2-chloroethyl diphenyl phosphite, and the like. Mixtures, such as a mixture of diphenyl and triphenyl phosphites, are also useful.

Where the phosphites of the Formula IV are arylalkyl phosphites, at least one of R, X or Y is an arylalkyl of Formula IV(a):

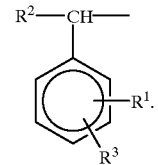

IV(a)

In Formula IV(a) $R^1$, $R^2$, and $R^3$ are as in Formula I. Illustrative of arylalkyl phosphite hardeners are dibenzyl phosphite, benzyl phenyl phosphite and tribenzyl phosphite.

The work time of the resole resin can vary over a broad range by varying the total water content, the use of retarder or accelerator additives, the specific phosphite hardening agent, pre-solvolysis of the phosphite and its quantity.

Ambient Temperature Hardening Resole Compositions

The room or ambient temperature hardening compositions of this invention will preferably have a work time of at least 15 minutes and up to about 2 hours. For typical ambient temperature hardening, a composition consisting of phenolic resole and 13% by weight latent acid hardener, such as aryl phosphite wherein the total water content of the composition is one part of water for each part by weight of aryl phosphite, preferably attains a Shore D hardness of at least 25 within 24 hours after mixing at a temperature of about 23° C. The Shore D hardness is measured by use of a Durometer Type D of the Shore Instrument and Manufacturing Company located in New York.

The ambient temperature hardening agents are preferably strong acids or those having either a diaryl hydrogen phosphite, a triaryl phosphite or a diaryl monoalkyl phosphite wherein the triaryl phosphite or diaryl monoalkyl phosphite is pre-hydrolyzed with from about 1% to 10% of water based on the weight of the aryl phosphite. Generally, the phosphites having 3 organic substituents are too slow to harden at ambient temperature within practicable time periods unless they have been pre-hydrolyzed. Also, such trisubstituted phosphites are incompatible in resins having 10% or more water and in many cases are incompatible even with resin containing less than 10% water unless they are pre-solvolyzed with water, alkanol or glycol.

Other latent acids suitable for ambient temperature hardening include those of U.S. Pat. No. 5,378,793 to Orpin (partial phosphate esters).

Hardening at Moderately Elevated Temperatures

Latent acid hardeners of U.S. Pat. Nos. 5,243,015, 5,378,793 or aryl phosphites of U.S. Pat. No. 5,317,050 having three organic substituents, such as triaryl phosphites or diaryl monoalkyl phosphites, are preferably used as latent acid hardeners to provide extended periods of stability at ambient temperature for the hardenable compositions and rapid hardening at moderately elevated temperatures such as those not above 100° C., e.g., about 50° C. to 95° C. The viscosity of the basic ingredients, i.e., phenolic resin, aryl phosphite, and water, for the trisubstituted aryl phosphites are capable of remaining flowable at ambient temperature for a period of at least four hours. Thus, such hardeners can remain fluid for a period of 4 hours or more at a temperature of about 23° C. but cure rapidly at the higher temperatures. However, by use of low concentrations of diaryl hydrogen phosphites, or small concentrations of water or with retarders, diaryl hydrogen phosphites as well as the pre-hydrolyzed triaryl phosphites, pre-hydrolyzed diaryl monoalkyl phosphites can also have extended periods of ambient temperature stability and then be rapidly hardened at moderately elevated temperatures.

Moreover, aryl phosphites pre-solvolyzed with benzylic alcohol can also have extended periods of ambient temperature stability and then be rapidly hardened at moderately elevated temperature.

The quantity of the phosphite hardener used in this invention can vary over a wide range. Typical levels, based on resin weight, are that of at least about 3% such as that from about 3% to 20%, and preferably at least 5% such as about 5% to about 15% based on the weight of resin.

Pre-solvolysis of the Phosphite Hardener

Pre-solvolysis, i.e., hydrolysis or alcoholysis of the phosphites prior to being placed in the hardenable composition generally improves compatibility, at least for compounds wherein all three of the hydrogens on the phosphorous acid are substituted. Pre-hydrolysis enhances hardening activity whereas pre-alcoholysis can have a small enhancing effect with alkylene glycols of 2 to 4 carbons atoms, or a retarding effect as with methanol or other alkanols of 2 to 4 carbon atoms and benzylic alcohols of Formula I. Partial pre-solvolysis is obtained by reacting the aryl phosphite with about 1% to 10% of water or alcohol based on the weight of the aryl phosphite, e.g., by stirring or otherwise mixing the phosphite in contact with water or alcohol at room or slightly elevated temperatures. Partially pre-solvolyzing also may be done by reacting the phosphite with benzylic alcohol provided at levels of about 50 to about 150 weight percent of phosphite (to extend mix life). The benzylic alcohol is an alcohol of Formula I. The end point of the pre-solvolysis reaction can generally be observed when the mixture of aryl phosphite and solvolysis agent appear homogeneous so that the solvolysis agent is not discernable in the composition.

The phosphite can be subjected to both hydrolysis and alcoholysis. For example, an arylphosphite can be pre-solvolyzed with 1–3 weight percent water and then reacted with a benzylic alcohol of Formula I in amounts up to 100% based on weight of phosphite. In the alternative, the arylphosphite may be treated with the benzylic alcohol and subsequently treated with water.

Pre-solvolysis of phosphite with benzylic alcohol increases the mix life of the initial hardenable mixture while getting the same material after curing as if made without pre-solvolyzing the phosphite.

For example, 100 parts (including resin) of a mixture which includes resin, 8 parts added benzylic alcohol, and 10 parts added diphenyl phosphite may be made. This may be compared with a mixture of 100 parts resin with 18 parts of a mixture of benzylic alcohol (8 parts) and phosphite (10 parts). Pre-solvolyzing benzylic alcohol with phosphite and subsequent reaction with water generates phosphorous acid and regenerates benzylic alcohol, but increases the mix life.

Thus, the user can receive the three ingredients and decide how to mix them depending on desired mix life.

The Phenolic Resin Generally

The phenolic resins used in this invention includes resoles which are hardenable by acids. The resoles of this invention may be thermosetting, i.e., they form an infusible three dimensional polymer upon application of heat. Such phenolic resins include phenolic resole resins prepared with alkaline catalysts, the resins disclosed in U.S. Pat. No. 3,485,797 to Robbins which are characterized as having benzylic ether linkages prepared by metal ion catalyst, or modified phenolic resole resins such as those described in U.S. Pat. No. 4,740,535 to R. Iyer et al. Both the Iyer et al U.S. Pat. No. 4,740,535 and the Robbins U.S. Pat. No. 3,485,797 are incorporated herein by reference in their entirety.

As an alternative to resoles, or in combination with resoles, as described below, the phenolic resins may be thermoplastic novolac resins. Typical novolac resins are described by U.S. Pat. No. 5,340,888, to Lemon et al incorporated herein by reference in its entirety.

The phenolic resins can be phenol-formaldehyde resins or those wherein phenol is partially substituted by one or more phenolic compounds such as cresols, such as m-cresol, isopropylphenols, nonylphenols, naphthols, resorcinol, xylenols such as 3,5-xylenol, bisphenol-A, or other substituted phenols.

The Resole Resins

The phenolic resole resins are produced by the reaction of a phenol and a molar excess of a phenol-reactive aldehyde typically in the presence of an alkali or alkaline earth metal compound as condensing catalyst. They may also be prepared by employing metal free quaternary ammonium hydroxide or methoxide or an organic amine such as triethyl amine as the condensing agent. Resins produced by use of the metal-free hydroxides are tetramethylammonium hydroxide, 2-hydroxyethyl trimethylammonium hydroxide (choline base), and benzyl trimethylammonium hydroxide and corresponding methoxides such as tetramethylammonium methoxide. Metal-free systems are preferred as binders for ceramic and electronic applications. The amount of metal-free hydroxide used can vary from about 0.01 to 0.04 mole per mole of phenol but is preferably about 0.01 to 0.025 mole per mole of phenol. Where the resoles are hardened by phosphite latent acids, use of ammonia, hexamethylene tetramine (HEXA), or organic amines as condensing catalysts are not preferred because they are higher in viscosity, and contain an amine which will buffer the action of in-situ production of phosphorous acid or phosphoric acid.

Typically, the resole resin will be a phenol-formaldehyde resin produced by reacting phenol and formaldehyde under alkaline conditions in a molar ratio (phenol: formaldehyde) within the range of from about 1:1 to 1:3. A preferred molar ratio for use in this invention ranges from about one mole of the phenol for each mole of the aldehyde to about 1 mole of phenol for 2.2 moles of the aldehyde and particularly a range of phenol to aldehyde of 1 to 1.2 to 1 to 2.

The preferred resole is the condensation product of phenol and formaldehyde. The quantity of resole employed in the hardenable compositions of this invention can vary over a wide range depending on the proposed use of the hardenable composition. Thus, the quantity of resin can vary from about 1.5% by weight of the hardenable composition to over 70% by weight of the composition. For refractory use, the quantity of hardenable resin will generally vary from about 3% to 20% by weight of the refractory aggregate and particularly from about 5% to 15% of resin based on the weight of aggregate. For other uses such as prepregs, the quantity of resin can be much greater such as that of about 20% to 40% by weight of the prepreg.

The aldehyde employed to make the resole resin may be, for example, formaldehyde, which is preferably used in the form of its aqueous solution, paraformaldehyde, acetaldehyde, furfuraldehyde or benzaldehyde. The resole may also be prepared by reacting a phenol, as described above, with a ketone, such as acetone, cyclohexanone or mixtures thereof to make novolac and converting the novolac to a resole by reaction with formaldehyde.

The pH of the phenolic resin used in this invention will generally vary from about 4 to 9 preferably 4 to 7, and particularly a pH of 4.5 to 6.5. Resins having a pH substantially above 9 should be avoided because such high pH reduces the subsequent acidity of the composition.

Free phenol will typically be 3% to about 20% by weight of the resin with preferred levels being 7% to about 15%. The molecular weight of the resin will generally vary from about 200 to 2,000 weight average molecular weight with about 230 to about 600 being preferred. Free formaldehyde will typically vary from about 0.3% to about 3% and preferably about 0.7% to about 2.5% by weight of the resin. The weight average molecular weight (Mw) is measured using gel permeation chromatography and phenolic compounds and polystyrene standards.

The phenolic resin solids can vary over a broad range such as that of about 50% to 85% by weight of the phenolic resin and preferably from 60% to 75%.

The viscosity of resin, can vary over a broad range such as that of about 50 to 5,000 cps at 25° C. Preferably, the viscosity varies from about 200 to 1500 cps at 25° C. The viscosity measurements herein are given in centipoises (cps) as measured by a Brookfield viscometer at 25° C.

Typically, water contents for the phenolic resole resins will be at least about 3% such as from about 3% to 20% by weight of the resin and preferably about 5% to 13% by weight of the resin.

The liquid portion of the resole resin is water or water together with a non-reactive solvent. Solvents in addition to water can be selected from alcohols of one to five carbon atoms, diacetone alcohol, glycols of 2 to 6 carbon atoms, mono- and dimethyl or butyl ethers of glycols, low molecular weight (200–600) polyethylene glycols and methyl ethers thereof, phenolics of 6 to 15 carbons, phenoxyethanol, aprotic solvents, e.g., dimethyl sulfoxide, tetramethylene sulfone, methyl ethyl ketone, methyl isobutyl ketone, cyclic ethers such as tetrahydrofuran and m-dioxolane, and the like. The quantity of monohydric alcohol or glycol, if employed is generally about 5% to 10% by weight of the resin because alkanols are fairly strong retarders. Also, various amides should be used sparingly because they can retard resin hardening.

The Novolac Resins

The phenolic novolac resin may be made in any of the known ways. To obtain a resin having the properties of a novolac, that is to say, to obtain a product which does not thermoset upon heating, it is necessary to react the phenol and the aldehyde in a molar ratio of less than 1 mole of aldehyde to each mole of the phenol.

The novolac resin may be prepared using any of the catalysts commonly employed for this purpose. Suitable acid catalysts include the strong mineral acids, such as sulfuric, phosphoric and hydrochloric acids, and organic acids, such as oxalic and salicylic acids or anhydrides, such as maleic anhydride.

As stated above, the phenol and the aldehyde are reacted together in a molar ratio of less than 1 mole of aldehyde to each mole of the phenol. In general, the aldehyde will not be used in a molar ratio to phenol of less than 0.2:1. Preferably, the aldehyde used is formaldehyde. To obtain a good compromise of properties a preferred formaldehyde to phenol molar ratio ranges from 0.4:1 to 0.75:1. The aldehyde may be replaced by benzaldehyde or ketones and the phenol may be partially replaced by cresols, xylenols, naphthols or bisphenol-A.

In the case of an acid-catalyzed novolac resin, it is only necessary to employ sufficient acidic material to obtain a satisfactory rate of condensation and the proportion required will vary with the type of acid used. In the case of the strong mineral acids, such as sulfuric acid or hydrochloric acid, this will generally be in the range of from 0.02 to 1.0%, and preferably from 0.1 to 0.6%, by weight based on the weight of the phenol employed. With organic acids, such as oxalic acid or maleic anhydride, it is typical to use amounts in the range of from 0.3 and 3% by weight based on the weight of the phenol employed.

Methods for the preparation of novolac resins are well known and are described, for example, in GB 1,210,239 and in GB 1,391,420.

The novolac resins formed are preferably treated, when the reaction is substantially complete, to remove unreacted phenol.

Phenolic novolacs are then modified to improve impact resistance and reduce brittleness according to the present invention by reaction with a substituted or unsubstituted benzylic alcohol with little or no adverse effect on fire-retardance, smoke and toxic emissions (FST). Upon completion of novolac production in the presence of acid catalyst and removal of most or all of excess phenolic monomer, the benzylic ingredient, i.e., benzylic alcohol and/or benzylic ether is introduced in the presence of the acid catalyst employed to prepare the novolac. Preferred benzylic ingredients are benzyl alcohol, anisyl alcohol, dibenzyl ether and mixtures thereof. The benzylic ingredient may be introduced alone or with additional strong and/or latent acid. Further heating at about 80° C. to about 150° C. leads to reaction of the benzylic ingredient. Preferred levels of alcohol are from about 5% to about 15 weight %. Acid catalysts are well known in the art and include, but are not limited to, sulfuric acid, methanesulfonic acid, aromatic sulfonic acids, and oxalic acid. Upon completion of the reaction with the benzylic ingredient, the acid is, optionally, either fully or partially neutralized with alkali or an amine or, optionally, fully or partially thermally decomposed (as with oxalic acid). If desired, the benzylic ingredient modified thermoplastic novolac may be isolated as an uncured product. In the alternative, the modified thermoplastic novolac may be cured. Cured benzylic ingredient modified novolacs can be obtained by heating the modified novolac described above to a temperature of about 100° C. to about 200° C. with a conventional crosslinking agent such as hexamethylene tetramine (HEXA), a latent formaldehyde source such as paraformaldehyde or tris(hydroxymethyl)nitromethane, or a melamine resin. The acid is typically fully or partially neutralized or decomposed where the crosslinking agent is HEXA. However, the acid is typically not neutralized or decomposed where the crosslinking agent is the melamine resin. In the alternative, cured benzylic ingredient modified novolacs can be obtained by blending a novolac with a benzylic ingredient, an effective amount of acid catalyst, and a curing agent such as a latent formaldehyde source or a melamine resin, and heating the mixture to a temperature from about 100° C. to about 200° C.

Another embodiment of a method to modify novolac includes mixing the novolac with a phosphite of Formula IV:

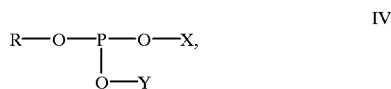

wherein at least one member of the group of R, Y and X of Formula IV (and preferably at least two members of the group of R, Y and X) is an arylalkyl of Formula IV(a):

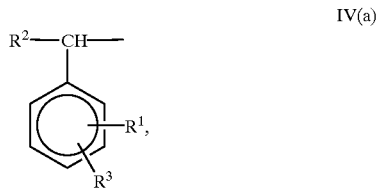

adding water and heating. Subsequent incorporation of a melamine resin will lead to modification of the resin and curing of the resin.

Water Content

Where aryl phosphite latent acid catalysts, or partial phosphate ester latent acid catalysts are employed, the hardening reaction of this invention requires water to hydrolyze the aryl phosphite or phosphate ester, e.g., eventually to phosphorous acid or phosphoric acid, respectively. The total water content in the composition i.e., water available for hydrolyzing the phosphite, can vary over a broad range such as that of about 0.15 to 5 parts of water by weight of each part by weight of the aryl phosphite, preferably from about 0.3 to 3 parts of water by weight for each part of the phosphite. In the case of resole resins, there is generally present a sufficient quantity of water, e.g., at least 3% based on the weight of resin, to hydrolyze the aryl phosphite and such compositions contain the requisite total water content even though the water is part of the resole resin. The requisite total water content can come from any of the ingredients in the composition, e.g., the resole resin, or additional water can be added to the composition. Water used for pre-solvolysis is not part of the total water content since such water was employed for hydrolysis of the aryl phosphite.

Fillers

The compositions of this invention can include fillers which are conventionally used with phenolic resins. The resins of the present invention may be mixed with a variety of fillers. The fillers are typically particles or fibers. Fibers are defined for the purposes of this description as a ribbon-like or threadlike unit of substance which is generally longer than it is wide. The filler may be made of an inorganic, ceramic, organic, or metallic substance. Typical particles may be in granular, powder, or flake form. Typically, such particles are employed as aggregate in polymer concrete, also known as resin concrete, for refractory or non-refractory uses. Monolithic cast shapes, for refractory or non-refractory uses, can be made using a mixture of graded sands mixed well with resin/hardener, introduced into a mold, cured in place and demolding the hardened shape. Such a shape could be a panel for building in architectural uses or for construction of corrosion resistant tanks to contain hot aqueous mineral acid.

Suitable inorganic materials include but are not limited to: silica, zircon sand, olivine sand, boron nitride, bauxite, quartz, chromite, and corundum and mixtures thereof. For certain applications, low density aggregate materials such as hollow microspheres, vermiculite, perlite, and pumice are preferred. Hollow microspheres of glass can also be employed in quantities of up to about 20% of the formulated resin product. For other applications, preferable high density aggregates include: quartz sand, gravel, crushed rock, and broken brick. Sand, gravel, and crushed rock are preferred aggregates in polymer concrete.

Other inorganic fillers include kaolin, wollastonite, and barite which can be used in quantities of up to about 70% by weight of the formulated resin product.

Inorganic fibers include those made of boron, glass, carbon, graphite, wollastonite or asbestos. Glass fibers are fine flexible fibers. They include borosilicate type glass known as E-glass. Another type of glass for fibers is known as S-glass which is higher in strength than E-glass. Glass fiber may be employed as woven glass fiber cloth, non-woven glass fiber cloth (mat), or chopped glass which is fiber cut to very short lengths. Corrugated building sheet is usually made of glass fiber mat with resin binder. Glass fiber bonded with a thermosetting resin can be employed for pipe and other insulation coverings. Also, glass fiber may be impregnated with resin and formed into blocks for high temperature use.

Graphite fibers are produced from organic fibers, such as rayon or polyacrylonitrile. Carbon fibers are produced from polyacrylonitrile, but do not have a graphitic microstructure. Moreover, polyacrylonitrile based carbon fibers are 93 to 95% carbon by elemental analysis whereas graphite fibers are 99+% carbon. The differences essentially result because graphite fiber is prepared at a higher temperature (3450–5450° F.) than carbon fiber (about 2400° F.).

Ceramic materials include alumina, zirconia, silicon carbide or silicon nitride. Typically, ceramic materials are employed as particles, e.g., aggregate, or fibers. The ceramic particles may be in granular, powder, or flake form. Granular form includes hollow ceramic microspheres and other typical granular forms. Typical ceramic fibers include alumina fibers or silicon carbide fibers.

Organic materials include polymers. The polymers may be particles, e.g., hollow microspheres of phenolic resin, or fibers. Typical polymer fibers are made of polypropylene, polyester, nonaromatic polyamides, e.g., nylon, aromatic polyamides, e.g., KEVLAR aramid fiber, which is a trademark of the DuPont Company, Wilmington, Del. The quantity of polymeric fibers or other fibers in compositions of the present invention may vary over a wide range to improve flexural strength of the composition.

Typical metallic materials include stainless steel which may be in the form of particles or fibers.

For refractory use, the compositions of this invention will often include silica or graphite. The quantity of silica will generally vary from about 1% to 5% by weight of the aggregate and the amount of graphite generally varies from about 5% to 25% by weight of the aggregate. Novolacs are also a useful additive for refractory use and the quantity of novolac can range from about 5% to 30% and preferably from about 10 to 20% by weight of the acid hardenable resin.

Acid reactive aggregates and fillers such as magnesite, calcium carbonate, metallic aluminum, and limestone are preferably avoided since they react under the acidic resin hardening conditions.

Modifiers as Reactive Diluents

In addition to the aforementioned benzylic alcohol or benzylic alcohol derivatives as reactive diluents, other reactive diluents may also be added with or dissolved in the phenolic resin. Such reactive diluents are advantageous in that they increase the percent of hardenable matter in a cured composite which in turn increases density and strength and reduces permeability to solvents and chemicals. These other reactive diluents include glycols, such as ethylene glycol or 1,3-butylene glycol, monoallyl or methallyl ethers of poly (methylol)alkanes, such as trimethylol propane allyl ether, monoallyl ether of glycerine, allyl or methallyl glycidyl ether, furfuryl alcohol, phenolics such as meta cresol, 3,5-xylenol, naphthol, nonylphenol, allylic alcohols, acetals, s-trioxane, vinyl ethers, amido compounds and N-methylol and N-alkoxy derivatives thereof, Schiff bases (condensate of an aromatic aldehyde with an aromatic primary amine), and diphenylamine.

Simple saturated glycols in general are modifiers by being plasticizers, but would not be classified as reactive diluents except possibly at high temperatures ($\geq 150°$ C.). For example, while not being bound by the following theory it is theorized that 1,3-butylene glycol could hydroxyalkylate a phenolic nucleus by protonation of the secondary hydroxyl as shown in equation (3):

(Eq. 3)

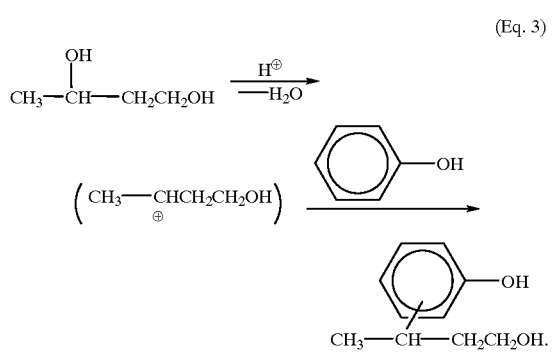

Also, while not being bound by the following theory it is theorized that unsaturated compounds, specifically allyl ether containing, could alkylate a phenolic nucleus under acid conditions as shown in equation (4):

(Eq. 4)

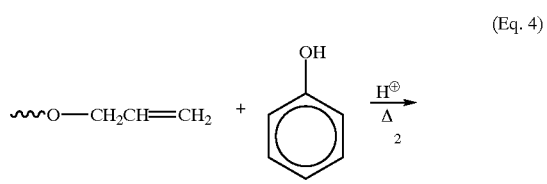

-continued

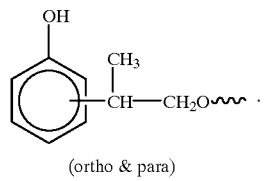

(ortho & para)

The aforementioned reactive diluents may be used in amounts of from about 2 to about 10 weight percent based on resin, but for furfuryl alcohol higher amounts may be used.

These modifiers are typically employed with benzylic alcohol or benzylic alcohol derivatives, e.g., dibenzylic ethers. However, some of these modifiers may also be employed as reactive diluents for phenolic resin in the absence of benzylic alcohol or benzylic alcohol derivatives. Such modifiers include trimethylolpropane allyl ether.

Epoxy Resin Additives As Reactive Diluents

Epoxy resin reactive diluents for use with or without benzylic alcohol or benzylic alcohol derivative include linear terminal moieties of Formula V:

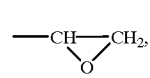

V which are of the 1,2 type, and internal moieties of Formula VI:

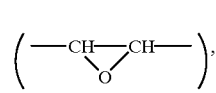

VI which can be linear, or cycloaliphatic moieties such as those of the Formula VII:

VII wherein R has from 3 to 4 carbon atoms and, together with the two carbon atoms shown in Formula VII, forms a cycloaliphatic group, such as cyclopentyl or cyclohexyl. The cycloaliphatic group can be substituted or unsubstituted such as with alkyl groups. It has been found that materials containing an internal epoxide group act as hardening retarders at ambient temperature.

Internal epoxy materials of the cycloaliphatic type include: limonene monoxide; cyclohexane oxide; vinyl cyclohexene monoxide; 3,4-epoxycyclohexyl methyl-3,4-epoxy cyclohexane-carboxylate (ERL 4221 which is sold by Union Carbide Corp); and bis(3,4-epoxycyclohexyl)adipate (ERL-4299 which is sold by Union Carbide Corp.). Mixed epoxies, i.e., those containing 1,2- and cycloaliphatic epoxide groups, include vinyl cyclohexene dioxide, and limonene dioxide. An example of an internal linear epoxide resin is methyl epoxy linseedate such as VIKOFLEX 9010 which is supplied by Elf Atochem North America, Inc., Bloomington, Minn. Other internal epoxies include epoxidized vegetable oils and epoxidized unsaturated fatty acids and fatty esters. The quantity of epoxy used in the compositions of this invention can vary over a broad range such as that of about 1% to about 20% based on weight of resins (B.O.R.), with preferred levels of about 5% to about 10% B.O.R.

A preferred epoxy compound is allyl glycidyl ether and the monoallyl ether of glycerine. The epoxy compounds are typically employed with the benzylic alcohol or benzylic alcohol derivative. However, some epoxy compounds, especially allyl glycidyl ether, may be employed as a reactive diluent for phenolics in the absence of benzylic alcohol or benzylic alcohol derivative. Another epoxy compound is the glycidyl ether of 2-butene-1,4-diol.

Organic Nitrogen Containing Additives

Nitrogen containing additives have many functions when used in the compositions of this invention. Nitrogen-containing additives with phosphorous compounds improve fire-retardancy. Those with —NH sites, function as in-situ formaldehyde scavengers upon heating and as reactive diluent with a resole. Another important function of the organic nitrogen containing additives is for post in-situ neutralization of acid via hydrolysis of an amide or Schiff base to liberate ammonia or organic amine. Neutralization increases applicability with acid sensitive substrates. Still another function of nitrogen compounds is to increase mix life at room or ambient temperature in the presence of latent acid hardener. Typical compounds include formamide at levels of 1–5% B.O.R., or N-methyl-2-pyrrolidinone or N-vinyl-2-pyrrolidinone employed at levels of 1–10% B.O.R.

A preferred embodiment employs a blend of N-vinyl-2-pyrrolidinone and benzyl alcohol.

Alkaline resoles e.g., resole resin prior to neutralization to an acidic pH, can be treated with formaldehyde scavengers such as urea, ethylene urea, primary nitroparaffins such as nitromethane, nitroethane, or 1-nitropropane at levels of 1 to 4% B.O.R.

Nitrogen-containing additives also may be selected from secondary amides, e.g., N-acylated arylamines, or N-acylated naphthylamines, or N-substituted arylsulfonamides. N-acylated arylamines are defined by Formula VIII as follows:

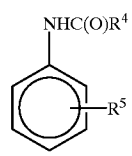

VIII wherein, $R^4$ and $R^5$ are independently selected from the group consisting of H, alkyl of 1–4 carbons, and phenyl. N-acylated naphthylamines are defined by Formula IX as follows:

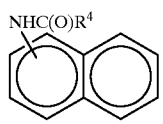

IX wherein $R^4$ and $R^5$ are defined as above.

A typical N-acylated arylamine is acetanilide ($C_6H_5NH(COCH_3)$).

N-substituted arylsulfonamides are defined by Formula X as follows:

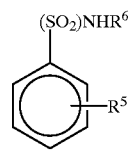

X $R^6$ is selected from the group consisting of alkyl of 1–4 carbons or an hydroxylalkyl of 2–4 carbons. $R^5$ is defined as above. A typical N-substituted arylsulfonamide is N-butylbezenesulfonamide or N-hydroxypropylbenzenesulfonamide.

Secondary amides be they acetanilide or arylsulfonamides can react at the —NH site with formaldehyde or a methylol group. Benzenesulfonamide derivatives such as UNIPLEX 214 and 225 plasticizers, available from Unitex Chemical Corp., Greensboro, N.C., contain about 15% sulfur which equates to about 0.75% sulfur in resin when used at 5% B.O.R.

Nitrogen-containing additives also may be selected from N-substituted arylamines defined by Formula XI as follows:

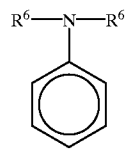

XI wherein each $R^6$ is independently selected from the $R^6$ groups as defined above.

A typical N-substituted arylamine is N-phenyldiethanol amine.

The nitrogen-containing additives are typically employed with a benzylic alcohol or benzylic alcohol derivative reactive diluents as defined above. However, the organic nitrogen-containing additives discussed above, e.g., N-acylated arylamine, N-acylated naphthylamine, or N-substituted arylsulfonamide may be employed alone as a reactive diluent or with other reactive diluents.

Silanes

The phenolic resins may also be formulated with organic functional silane coupling agents. Typical silane levels are 0.1 to 1.5% B.O.R. Silanes are preferably used with fillers, e.g., aggregates, with surface hydroxyl sites. Such fillers include those made of alumina, silica, glass fiber, glass cloth, and acid resistant silicates. Some specific silanes are γ-aminopropyltriethoxy (ortrimethoxy) silane, N-β-aminoethyl-γ-aminopropyltrimethoxysilane, γ-ureidopropyl triethoxysilane, 3-glycidoxypropyl trimethoxysilane, 2-ethyl trimethoxysilane, tris(3-methoxysilyl)propyl isocyanurate, and N-phenylaminopropyl trimethoxysilane.

Miscellaneous Additives

Surfactants, particularly wetting and/or dispersing agents, may also be incorporated into the resin which are advantageous for wetting and/or dispersing aggregates, glass fiber, or glass mat.

EXAMPLES

In order that those skilled in the art may more fully understand the invention presented herein, the following procedures and examples are set forth. All parts and percentages in the examples, as well as elsewhere in this application, are by weight and room temperatures are at 24±1° C., unless the context indicates otherwise. The time given for hardening reactions is the time starting from the time the mixture was prepared until the mixture hardens, unless the context indicates otherwise.

Procedures, Preparation of Resins and Properties

Resin A is a phenolic resole resin prepared by reacting phenol and formaldehyde in a mole ratio of one mole phenol for each 1.65 moles of formaldehyde in the presence of sodium hydroxide as catalyst. The resin, before neutralization to a pH of 5–6 with diphenyl phosphite, had the following properties: about 8.5 weight percent free phenol; about 2.5 weight percent free formaldehyde; about 8.5% water; pH of about 7.6; and weight (Mw) and number (Mn) molecular weight averages (excluding phenol) of about 320 and about 230, respectively.

Unless specified otherwise, Resin A was used as is or with 8.5% additives by weight on resin. Additives were selected from benzyl alcohol, anisyl alcohol, 1:1 blend of benzyl and anisyl alcohols, and nonylphenol. Resin with alcohol additives had a viscosity of 1250 cps±150 cps (25° C.) whereas with nonylphenol the viscosity was greater.

In a number of Examples as stated below, Resin A was treated with 2% 60/40 1-nitropropane/nitroethane prior to neutralization. This reduced the free formaldehyde to about 1.4% after neutralization to pH 5–6 and addition of benzylic alcohol(s).

Resin A can be used prior to neutralization to a pH of 5–6 but it is desirable to increase the level of acid or latent acid hardener. For example, when diphenyl phosphite is used with the alkaline resole, 1 to 2% additional phosphite is recommended for curing.

Procedure for Determining Effect of Additives on Qualitative Flow of Phenolic Resin Acid Catalyst Mixes This procedure is also referred to as the Qualitative Flow Procedure. All or parts of this procedure were used in many of the examples for determining flow and hardening rate of the mixtures. Also, definition of terms relating to flow or hardness are set forth herein. Unless otherwise indicated in the example involved, the overall procedure is as follows. Glass vials (28 mm×57 mm) are charged with resin, additive and solvent, if any, as indicated in each example and after solution was effected, the phosphite catalyst was added and mixed well for one minute. Relative viscosities of the mixes were observed by laying the vials at right angles, i.e., on their sides, at various intervals upon standing at room temperature. Unless otherwise indicated, the recorded time for the various observations and changes of viscosity or flow are given from the time the mixes were prepared to the time of observation. All mixes were quite fluid initially but generally became immobile and tack-free in time. An early indication of viscosity increase is cloudiness and a still more advanced indication is that of the composition being opaque.

Immobile mixes were probed with an applicator stick to determine relative degree of fluidity. With increasing viscosity, the fluidity of the composition range from fluid to a showing of stickiness on the stick which is referred to as sticky to a taffy-like tackiness and then to tack-free wherein the stick pulls out of the composition clean and free of resin. The tack-free condition is also referred to as stick clean. Stick hard refers to a hardening of the composition so that the applicator stick bends or breaks on trying to penetrate the composition also referred to as a mix. The applicator sticks are long grain birch wood, of 2 millimeters in diameter and are supplied by American Scientific Products (Mcgraw Park, Ill., Cat. No. A-5000-1). Additionally, in some instances comparative viscosity increases or hardness increases were recorded, e.g., 3>2>1 means that the viscosity of Mix 3 was higher or greater than that of Mix 2 which in turn was greater than Mix 1.

Example 1

RTM (Resin Transfer Molding) Simulation of Preparation of Panels

The RTM Simulation was run in an open mold. This mold was made of ¼" thick stainless steel plates utilizing ⅛" Teflon spacers on three sides with the top side open (and beveled for easier mold filling). This mold produced a 6½"×8⅜"×⅛" resin panel from approximately 150 grams of resin solution if it was filled to capacity. All tests in this series were produced from 100 to 150 grams of resin solution. The mold was prepared by wiping with a mold release agent and preheated to 80° C.

The resin solution contains 9% B.O.R. diphenyl phosphite hardener DOVERPHOS 213-LP, manufactured by Dover Chemical Corp., Dover, Ohio. The solution was prepared at room temperature and the hardener hand mixed in. The solution was then sonicated to remove air entrainment and poured into the preheated mold. The mold was immediately placed in the 80° C. oven. All mold tests had 40 minutes in the 80° C. oven. Immediately upon completing the 40 minute oven time, the mold was removed from the oven and opened. The resulting panel was then flexed by band lengthwise to determine ability to bend or even roll up (if possible). Table 1 shows the results of flexing of Samples 1–6. Sample Nos. 1–3 are a first set of samples, Samples 4–5 form a second set, and Samples 7 and 8 form a third set except as noted on Table 1. The sets may have been made from different batches of Resin A.

Resin containing anisyl alcohol was stick hard (i.e., did not penetrate the hot mass with hard pressure using an applicator stick) at least 10 minutes prior to removing the mold from the oven. In contrast, resin with benzyl alcohol exhibited some rubbery characteristics upon removal from the oven.

Ability to harden rapidly is critical in applications (e.g., RTM, SCRIMP) where a hot partially cured shape is removed from the mold. Deformation of the shape would be highly undesirable.

TABLE 1

| Sample No. | Alcohol Additive | Example - 1 Panel Test RTM Flex in Inches |
|---|---|---|
| 1 | Anisyl | 1 |
| 2 | Benzyl | 2 |
| 3 | None | 1 |
| 4 | Anisyl | 1 |
| 5 | Benzyl | 4.5 |
| 6 | None | 1 |
| 7* | 1:1 Benzyl/Anisyl | 3 |
| 8 | 1:1 Benzyl/Anisyl | 3 |

*Resin was nitroparaffin treated

The results of Table 1 show that use of anisyl alcohol, or no added alcohol, cured to a firmer (less flexible) panel than when benzyl alcohol was employed. However, anisyl alcohol improved impact strength as discussed in Example 2. Use of a 1:1 blend of benzyl alcohol:anisyl alcohol achieved a flexibility between that of benzyl alcohol or anisyl alcohol alone.

Example 2

Impact Testing of Disks

Circular disks having a 39 mm. diameter were prepared to have a nearly flat top and concave bottom. The disks were 5 mm. at the thickest outside edge; and approximately 4 mm. thick at the center. The disks were made as follows:

Disk preparation

1. Dipheny phosphite, described above used at 13% B.O.R.
2. Sufficient quantity of Resin A, hardener, and optionally alcohol was prepared to pour three disks of 6.3±0.03 grams in 50 ml plastic beakers.
3. The beakers were covered with PARAFILM "M" laboratory film made by American National Can, Greenwich, Conn., and left at room temperature overnight to form hardened disks.
4. The disks were examined for firmness by prodding with a wooden applicator stick at 23–24 hours after being left at room temperature.
5. The disks were cured to stick hard while hot in a 65° C. oven. This generally takes only one hour but may take as much as two hours.
6. After cooling and labeling, the disks were sanded on the top to remove any "lip" that may have formed during pouring.
7. The disks were then weighed (three together).
8. The disks were post-cured two hours at 80° C. and one hour at 100° C. Weight loss of the disks was measured after sufficient cool-down/equilibrium time. The disks were stored at room temperature and tested for impact and hardness the next day. The weight losses of the disks going from 65° to 100° C. are from 0.6 to 1% but mostly 0.8±0.1%. Shore D hardness of the sample disks are all about 88±2.

Impact Testing

The Impact Test consists of dropping a stainless steel ball, on to the disk, through a 1.125 inch inside diameter (ID) plastic tube of 28 or 36 inches in length, placed vertically perpendicular to the disk. The bottom of the tube is 1.75 inches above the disk.

There are six runs to the series. The runs are progressively more strenuous. Two drops of the ball without shattering either time is considered a pass of a run. A product pass consists of getting two or more of the disks through a run. The balls and tubes employed for Impact Testing have the following dimensions.

Small ball=15/16 inch diameter ball, approximately 55 grams

Medium ball=1 inch diameter ball, approximately 65 grams

Large ball=1⅛ inch diameter ball, approximately 95 grams

Small tube=28 inch in length

Large tube=36½ inch in length

Runs:
1=Small ball/Small tube
2=Small ball/Large tube
3=Medium ball/Small tube
4=Medium ball/Large tube
5=Large ball/Small tube
6=Large ball/Large tube The Impact Test results are shown on Table 2. In Table 2, Sample Nos. 1–4, 5–7 and 8–10 are, respectively, separate sample sets which may have been made from different batches of Resin A. The tests are done in triplicate. The Impact Test results list the number of samples that pass a given test and those that failed (broke). For example, in Sample No. 1 of Table 2, two disks passed through all 6 runs and one disk broke on the second run as indicated by the "x" listed for Sample No. 1.

TABLE 2

| | | Impact Test | |
|---|---|---|---|
| Sample No. | Alcohol Additive | Impact Resistance | Number of Runs for which Two Disks Passed |
| 1 | Anisyl | Two through 6 runs/1x2nd | 6 |
| 2 | Benzyl | Two through 6 runs/1x1st | 6 |
| 3* | 4-Methylbenzyl | 2x1st/1x3rd | 0 |
| 4 | None | 3x1st | 0 |
| 5 | Anisyl | 2x1st/1x3rd | 0 |
| 6 | Benzyl | One through 6 runs/1x1st/1x6th | 5 |
| 7 | None | 3x1st | 0 |
| 8 | Anisyl | 1x2nd/1x4th/1x5th | 3 |
| 9 | Benzyl | 1x1st/1x4th/1x6th | 3 |
| 10 | Nonylphenol | One through 6 runs/2x1st | 0 |
| 11** | 1:1 Benzyl/Anisyl | One through 6 runs/1x2nd/1x6th | 5 |
| 12 | 1:1 Benzyl/Anisyl | Two through 6 runs/1x3rd | 6 |
| 13 | 1:1 Benzyl/N-vinyl-2-pyrrolidinone (10% B.O.R.) | Two through 5 runs/1x4th/2x6th | 5 |

*Sample results appear to be an aberration and not representative of performance expected by present inventor
**Resin was nitroparaffin treated Table 2 shows Sample Nos. I and 2 passed 6 runs (i.e., 2 disks were unbroken) with 1 disk breaking during the 2nd and 1st runs, respectively. Samples 4 and 7 indicate that no disks passed the 1st run, i.e., all 3 broke. This clearly shows the benefit to impact resistance of anisyl alcohol, benzyl alcohol or a mixture of anisyl alcohol and benzyl alcohol.

The impact resistance of sec-phenethyl alcohol (also termed cc-methylbenzyl alcohol) was also measured. The impact resistance was found to be between that of samples made with no alcohol and benzyl alcohol. Resin A when treated with 2% 60/40 1-nitropropane/nitroethane formaldehyde scavenger achieved superior impact resistance with anisyl or benzyl alcohol as compared to having no alcohol.

Excess solutions from preparation of impact disks were allowed to stand at room temperature in a closed glass vial for 24 hours. Hardness, determined qualitatively with an applicator stick, of the immobile hardened mass increased as follows: anisyl alcohol>nonyl phenol>benzyl alcohol>4-methyl benzyl alcohol.

Example 3

Hand Lay-Up Evaluation

To determine the effect of the present invention on strength of fiber laden laminate, experiments to obtain the following data were run. The following data include the fiber content data of three laminate samples. This permitted normalization of the strength values of the samples. It appears that the viscosity of the phenolic laminates was not controlled as well as the polyester laminate. At any rate, the phenolic panels are much thicker—therefore strength and modulus numbers, which are fiber based tests, were about 15 to 20 percent lower than for the polyester laminate. However, when, normalized, the values of all three laminates became quite comparable.

The polyester was INTERPLASTIC 75-200-319 isophthalic acid based polyester (manufactured by Interplastic Corp., Vadnais Heights, Minn.). The polyester laminate underwent cure for one day at 75° F., followed by several days at about 80° to about 90° F. without post-curing at a higher temperature. The phenolic laminates were cured for one day at 75° F., followed by several days at about 80° to about 90° F. Then, as discussed below, the laminates were cut and a portion of each laminate post-cured at 140° F. for 6 hours and another portion of each laminate was not post-cured. The phenolic laminates contained 55 to 56% resin (by weight), and the polyester laminates contained 48% resin, with the remainder being fiberglass. The fiberglass reinforcements were employed in a variety of forms as indicated below and blended with resin having approximately a 600 cps mixed viscosity. Wetting of reinforcements appeared adequate.

The following materials were employed together to represent most field practices for a relatively high structural strength product. Each laminate panel of this example included all of the following materials.

1 ply fiberglass veil mat 1 ply 18 ounce woven roving fiberglass (WR)

1 ply 1 ounce chopped strand mat (csm)

1 ply 18 oz. WR 1 ply 1 oz. csm 1 ply 18 oz. WR 1 ply 1 oz. csm 1 ply 18 oz. WR 1 ply 1 oz. csm 1 ply WR Construction of Test Panels 1. Mold release agent was applied to a glass plate. The resin was Resin A treated with a 2% 60/40 blend of 1-nitropropane/nitroethane, then neutralized to pH 5–6, and then benzyl alcohol (8½% B.O.R.) was added.

2. A 300 g batch of resin was employed. Catalyzed resin was prepared by adding to the 300 g batch of resin, 2% distilled water, and 13% diphenyl phosphite which had been pre-reacted with 10% SUPER SET BW 70 (70% benzenesulfonic acid) made by Borden, Inc., Forest Park, Ill. The resultant viscosity was approximately 500–600 cps at 24–25° C.

3. Immediately thereafter, lay-up was started as follows:

(A) The mold surface of the glass plate was brush coated with resin. (Approximately 14×14 mold surface)

(B) All reinforcement plies were cut to approximately 13×13. The first ply, the veil mat, was applied. A citrated roller was used to thoroughly wet the reinforcement and to remove all air.

(C) The first ply of woven roving was applied and then saturated with resin using a brush. Air was removed and saturation completed using the citrated roller.

(D) The first ply of csm was applied. Then the sample was saturated and its air rolled out.

(E) Steps C and D were repeated until all the plies were placed. A woven roving ply was the last one placed.

Note: About halfway through the above procedure, a second 300 g batch of resin was required. The resin was used within 10–15 minutes of preparation 26 ration. Once applied to the lay-up, the resin was manipulatable for 1 to 2 hours.

Observations

Total lay-up time was 30 minutes. Viscosity of resin in lay-up slowly increased at 2½ hours to a non-firm gel which could no longer be manipulated. At 3¾ hours the samples started to turn white with a very soft gel. At 5¾ hours the samples became a firm gel, having a pure white color. At 15½ hours, the laminate became a hard gel. De-molding of the samples appeared possible at this time but was not attempted.

At 23 hours, with an average maintained temperature of 75° F., laminate was removed from the glass plate. Excellent release was observed. The panel was edge trimmed and weighted. The phenolic panel was cut in half. One half remained at room temperature for observation. The other half was post cured at 140° F. for 6 hours. No warpage was observed in either half panel.

Use of this phenolic resin for typical open mold wet lay-up operations was straight forward, i.e., similar to polyester, vinylester or epoxy.

Tables 3–5 show a comparison of flexural strength and flexural modulus for phenolic resin of the present invention (Tables 3–4) and polyester (Table 5). The flexural strength data was generated in accordance with ASTM-D-790 (which includes flexural modulus). Tables 6–8 show a comparison of tensile strength and tensile modulus for resin of the present invention (Tables 6–7) and polyester (Table 8). The tensile strength data was generated in accordance with ASTM-D-638 (which includes tensile modulus).

The results of Tables 3–8 show the phenolic system post baked at 140° F. (60° C.), when normalized for resin content and panel thickness, showed equivalent and approximately equivalent flexural and tensile strength, respectively, to the isophthalic acid based polyester.

Post-baking the phenolic system had no effect on tensile strength, but led to a small increase in flexural strength.

TABLE 3

Phenolic: Laminate Maintained at 80–90° F. (44.9% Fiber Content) Without Post-Curing

| Sample No. | Width (inches) | Thickness (inches) | Load (lbs) | Flexural Strength (psi) | Strength Normalized to thickness (0.208 inch) | Strength Normalized to Fiber Content (51.6%) | Flexural Modulus (psi × 10$^6$) | Modulus Normalized to Fiber Content (51.6%) |
|---|---|---|---|---|---|---|---|---|
| 1 | 0.498 | 0.249 | 158 | 30,450 | 36,610 | 35,020 | 1.97 | 2.27 |
| 2 | 0.498 | 0.255 | 148 | 27,160 | 34,290 | 31,230 | 1.61 | 1.85 |
| 3 | 0.498 | 0.25 | 140 | 26,770 | 32,440 | 30,790 | 1.59 | 1.83 |
| span: 3.968 inch for flexural modulus | | | Ave: 23,840 | | 34,450 | 32,350 | 1.72 | 1.98 |

TABLE 4

Phenolic: Laminate Maintained at 140° F. — 6 Hours (44.1% Fiber Content)

| Sample No. | Width (inches) | Thickness (inches) | Load (lbs) | Flexural Strength (psi) | Strength Normalized to thickness (0.208 inch) | Strength Normalized to Fiber Content (51.6%) | Flexural Modulus (psi × $10^6$) | Modulus Normalized to Fiber Content (51.6%) |
|---|---|---|---|---|---|---|---|---|
| 4 | 0.499 | 0.245 | 163 | 32,300 | 37,690 | 37,790 | 1.78 | 2.08 |
| 5 | 0.499 | 0.244 | 153 | 30,670 | 35,380 | 35,880 | 1.72 | 2.01 |
| 6 | 0.500 | 0.245 | 153 | 30,430 | 35,310 | 35,600 | 1.76 | 2.06 |
| span: 3.968 inch for flexural modulus | | | | Ave: 31,130 | 36,130 | 36,420 | 1.75 | 2.05 |

TABLE 5

Polyester Lay-up: Laminate Maintained at 80–90° F. (51.6% Fiber Content) Without Post-Curing

| Sample No. | Width (inches) | Thickness (inches) | Load (lbs) | Flexural Strength (psi) | Strength Normalized to thickness (0.208 inch) | Strength Normalized to Fiber Content (51.6%) | Flexural Modulus (psi × $10^6$) | Modulus Normalized to Fiber Content (51.6%) |
|---|---|---|---|---|---|---|---|---|
| 7 | 1.002 | 0.213 | 323 | 35,470 | 35,470 | 35,470 | 1.62 | 1.62 |
| 8 | 1.002 | 0.203 | 307 | 37,120 | 37,120 | 37,120 | 1.82 | 1.82 |
| 9 | 1.001 | 0.208 | 312 | 35,960 | 35,960 | 35,960 | 1.72 | 1.72 |
| span: 3.328 inch for flexural modulus | | | | Ave: 36,180 | 36,180 | 36,180 | 1.72 | 1.72 |

TABLE 6

Phenolic: Laminate Maintained at 80–90° F. (44.9% Fiber Content) Without Post-Curing

| Sample No. | Width (inches) | Thickness (inches) | Load (lbs) | Tensile Strength (psi) | Strength Normalized to thickness (0.196 inch) | Strength Normalized to Fiber Content (51.6%) | Tensile Modulus (psi × $10^6$) | Modulus Normalized to Fiber Content (51.6%) |
|---|---|---|---|---|---|---|---|---|
| 10 | 0.487 | 0.251 | 2,895 | 23,690 | 30,330 | 27,240 | 1.56 | 1.83 |
| 11 | 0.510 | 0.245 | 3,156 | 25,250 | 31,570 | 29,040 | 1.69 | 1.98 |
| 12 | 0.497 | 0.247 | 2,773 | 22,580 | 28,470 | 25,970 | 1.47 | 1.72 |
| | | | | Ave: 23,840 | 30,120 | 27,420 | 1.57 | 1.81 |

TABLE 7

Phenolic: Laminate Maintained at 140° F. — 6 Hours (44.1% Fiber Content)

| Sample No. | Width (inches) | Thickness (inches) | Load (lbs) | Tensile Strength (psi) | Strength Normalized to thickness (0.196 inch) | Strength Normalized to Fiber Content (51.6%) | Tensile Modulus (psi × $10^6$) | Modulus Normalized to Fiber Content (51.6%) |
|---|---|---|---|---|---|---|---|---|
| 13 | 0.492 | 0.245 | 2,827 | 23,460 | 29,320 | 27,450 | 1.81 | 2.12 |
| 14 | 0.474 | 0.244 | 2,961 | 25,590 | 31,870 | 29,940 | 1.7 | 1.99 |
| 15 | 0.501 | 0.246 | 2,965 | 24,040 | 30,190 | 28,130 | 1.56 | 1.83 |
| | | | | Ave: 24,370 | 30,460 | 28,510 | 1.68 | 1.97 |

TABLE 8

Polyester Lay-up: Laminate Maintained at 80–90° F. (51.6% Fiber Content) Without Post-Curing

| Sample No. | Width (inches) | Thickness (inches) | Load (lbs) | Tensile Strength (psi) | Strength Normalized to thickness (0.196 inch) | Strength Normalized to Fiber Content (51.6%) | Tensile Modulus (psi × $10^6$) | Modulus Normalized to Fiber Content (51.6%) |
|---|---|---|---|---|---|---|---|---|
| 16 | 0.502 | 0.197 | 3,201 | 32,370 | 32,530 | 32,530 | 2.05 | 2.05 |
| 17 | 0.503 | 0.199 | 3,318 | 33,150 | 33,660 | 33,660 | 2.31 | 2.31 |
| 18 | 0.503 | 0.192 | 3,167 | 32,790 | 32,120 | 32,120 | 2.18 | 2.18 |
| | | | | Ave: 32,770 | 32,770 | 32,770 | 2.18 | 2.18 |

Example 4

Room Temperature Reactivity of Resin with Benzyl Alcohol vs. Anisyl Alcohol

Two vials each containing 2.5 grams of a solution of phenolic resin, benzyl alcohol and diphenyl phosphite were prepared and covered. The solution contained Resin A, 8½ weight percent B.O.R. benzyl alcohol, and 13 weight percent B.O.R. diphenyl phosphite. Also, two vials each containing 2.5 grams of a solution of Resin A, anisyl alcohol and diphenyl phosphite were prepared and covered. The solution contained 8½ weight percent B.O.R. anisyl alcohol and 13 weight percent B.O.R. diphenyl phosphite. Resin A was adjusted to pH 5–6 prior to adding benzyl or anisyl alcohol. One of each pair of vials was placed in a 110° F. (43° C.) oven and the other allowed to stand at room temperature (R.T.).

For the samples held at 110° F., after 1 hour, the solutions were clear and mobile. After 2 hours, the mixes were opaque and gelled. Moreover, after 2 hours the mix with anisyl alcohol was essentially stick hard (i.e., upon penetration with an applicator stick the stick will either bend or break) whereas the mixture with benzyl alcohol was slightly tacky.

As for the room temperature samples, after 24 hours, the anisyl alcohol-containing sample was nearly stick hard. In contrast, the benzyl alcohol-containing sample was not stick hard (and thus softer than the anisyl alcohol-containing samples). This example shows the unexpected increase in hardening speed achieved by use of anisyl alcohol.

Example 5

Determination of the Effect of Urea and Ethylene Urea (Formaldehyde Scavengers) on Impact and Flex of Panels To Resin A, neutralized to pH 5–6, and containing benzyl alcohol, was added the ingredients listed in Table 9, and then 9% diphenyl phosphite was added.

TABLE 9

| Sample No. | Additive (weight %) | Flex by RTM Simulation (inches) |
|---|---|---|
| 1 (Control) | 2% water | 2½ |
| 2 | 2% water and 2% urea | 1½ |
| 3 | 2% water and 2% ethylene urea | 1½ |

Impact disks were prepared from these resins and were allowed to harden at room temperature for one (1) day. As Table 9 shows Samples 2 and 3 had about equal flex and Sample 1 had higher flex than Samples 2 or 3. This example shows the urea-containing materials achieve a greater degree of hardness. Impact resistance for Samples 1–3 were measured and found to be essentially equivalent.

Example 6

Method for Increasing Mix Life of Acid Hardenable Resole Using Aryl Phosphite and Benzylic Alcohol The following solutions were made:

Pre-reaction Solution #1 from 8.5 g benzyl alcohol (BZOH)

6.0 g diphenyl phosphite (DPP)
Pre-reaction Solution #2
from 4.25 g benzyl alcohol 6.5 g diphenyl phosphite
Both solutions were prepared at room temperature and then heated ½ hour in a 65° C. oven. A series of mixes were made as listed in Table 10. Each mix of Table 10 included 5.0 g of Resin A (un-neutralized).

TABLE 10

| Mix | Additives, grams | Elapsed Time After Mix, Hours | Approximate Flow Loss At Room Temperature |
|---|---|---|---|
| 1 | 0.43 BZOH | 7 | 10% |
|   | 0.30 DPP | 23 | 60% |
|   |   | 30 | 85% |
|   |   | 48 | 100% (no flow); slightly tacky |
| 2 | 0.73 Solution #1 | 7 | none |
|   |   | 23 | 20% |
|   |   | 30 | 35% |
|   |   | 48 | 60%; clear solution |
| 3 | 0.43 BZOH | 4 | 17% |
|   | 0.65 DPP | 7 | 58% |
|   |   | 24 | 100% (no flow); tack-free moderately stick penetratable |
| 4 | 1.08 Solution #2 | 4 | little to none |
|   |   | 7 | 17% |
|   |   | 24 | 90%; about 70% of mix is opaque and slowly flowable |

Just after preparation, 1.0 g of each mix was placed in a small test tube, an applicator stick introduced and the tube placed in a boiling water bath (100° C.). Time to gel hard was observed and the observed time is listed in Table 11.

TABLE 11

| Mix | Gel Hard Time at 100° C., min. |
|---|---|
| 1 | 6 |
| 2 | 11 |
| 3 | 2 |
| 4 | 4 |

This example clearly shows that pre-reacting the benzylic alcohol with aryl phosphite, relative to adding the alcohol to resin with subsequent addition of phosphite hardener, significantly increases room temperature while still affording fairly rapid curing at elevated temperature.

Examples 7–14

Effects of Impact Modifier on Physical Properties of Glass Cloth Reinforced RTM Laminates In the following examples, a Resin B was employed. Resin B is an intermediate form of the above-described Resin A prior to pH adjustment by diphenyl phosphite and addition of 1:1 anisyl alcohol:benzyl alcohol.

Resin B is characterized as follows:

| | |
|---|---|
| Solids, % | about 77 |
| Phenol, % | about 9 |
| Water, % | about 8 |
| Viscosity, cps (25° C.) | about 2300 |
| Molecular Weight, Mw | about 340 |

To Resin B was added various additives as listed on Table 12. The additives were added at 8% based on resin weight unless specified otherwise.

TABLE 12

Effect of Impact Modifier on Physical Properties of Glass Cloth Reinforced RTM Laminates[a]

| Ex. | Additive (8% BOR) | 1:1 Anisyl-Benzyl Alcohols | Anisyl Alcohol | Anisyl Alcohol at 4% BOR | Benzyl Alcohol | None |
|---|---|---|---|---|---|---|
| 7 | Tensile strength (psi) | 43,700 | 44,290 | 25,150 | 42,180 | 24,680 |
| 8 | Tensile Modulus (Msi) | 2.6 | 2.8 | 2.6 | 2.7 | 2.6 |
| 9 | Flexural Strength (psi) | 51,850 | 61,930 | 42,170 | 49,080 | 32,490 |
| 10 | Flexural Modulus (Msi) | 3.1 | 3 | 2.5 | 3 | 2.3 |
| 11 | Izod Impact (ft-lbs/in) | 14.1 | 18.8 | 14.3 | 18.3 | 9.36 |
| 12 | Weight Loss (%) | 4.33 | 4.42 | 5.39 | 5.79 | 4.93 |
| 13 | Shrinkage by thickness (%) | 1.44 | 1.80 | 3.12 | 3.51 | 2.37 |
| 14 | Resin Content (%) | 36.7 | 32.5[b] | 37.7 | 38.9 | 36.6 |

Footnotes:
[a]post cured (one hour each at 80° C., 100° C., 125° C.)
[b]The significantly lower resin content, therefore higher glass reinforcement, in this laminate is probably responsible for the high flexural strength and may contribute to both tensile and impact properties.

Examples 15–31

Effect of Additives on Impact Resistance

The following Examples 15–31 employed either the above-described Resin B (unless indicated otherwise or Resin C with the additives as listed in Table 13. Resin C is a phenolic resin made by a procedure similar to that for making Resin B. However, Resin C was made in the presence of potassium hydroxide as catalyst.

Disc Preparation

One of the aforementioned resins was neutralized with diphenyl phosphite (DPP) (1.6% B.O.R.) and candidate material(s) added usually at 3–5% B.O.R. Latent acid hardener DPP (13% on formulated resin) was added. Cured discs (1.5 inches diameter by 0.375 inches thick) were prepared, generally in at least triplicate, by adding 6.3g. mix to a 50 ml plastic beaker, allowing the mix to stand covered for 24 hours, and followed by heating the mix 1 to 2 hours at 65° C. Discs were removed from the containers, edge flanges sanded off, weighed and then heated two hours at 80° C. followed by one hour at 100° C. Discs were re-weighed at room temperature to determine weight loss and then tested for impact resistance. Weight losses of 0.8–0.9% were noted in heating discs from 65° C. to 100° C. An additional 1% was lost when heating two hours at 125° C.

Impact Testing

Cured discs were placed on a hard wood base and subjected to increasing impact as described above.

In a number of instances discs that passed six rounds of impact testing were further heated two hours at 125° C. Upon cooling and conditioning at room temperature impact testing was repeated. Results of impact testing are shown in Table 13. In several instances the control, no additive, failed to pass the first round, that is at least two of three specimens fractured.

TABLE 13

Effect of Additives on Impact Resistance

| | | Impact Resistance[e] | | | | |
|---|---|---|---|---|---|---|
| | | 80–100° C. Post Cure | | 125° C. Post Cure | | |
| Ex. | Additive(s)[c] (% BOR)[d] | 5th Rd. | 6th Rd. | 4th Rd. | 5th Rd. | 6th Rd. |
| 15 | BD(3), AC(5)[f] | | 3/4 | | | 1/3 |
| 16 | BD(3), AC(5) | | 3/3 | | 2/3 | 1/2 |
| 17 | BD(3), UN171(5) | 2/2 | 1/2 | | 1/1 | 0 |
| 18 | AN(3), AC(5) | 2/2 | 2/2 | | | 1/2 |
| 19 | BD(3), AN(3) | 2/3 | 1/2 | | 1/1 | 0 |
| 20 | BD(3), UN214(5) | | 4/4 | | 4/4 | 2/4 |
| 21 | BD(3), UN225(5) | | 4/4 | | 4/4 | 2/4 |
| 22 | BZ₂O(4.3), AN(4.3) | | 2/4 | | 2/2 | 0 |
| 23 | BD(3), BZ₂O(5) | | 2/4 | | | 2/2 |
| 24 | BZ₂O(5), AC(5) | | 2/4 | 2/2 | | 1/2 |
| 25 | BZ₂O(5), UN214(5) | | 3/4 | 3/3 | | 1/3 |
| 26 | TMPAE(5) | | 2/4 | | | 1/2 |
| 27 | AGE(5) | 4/4 | 3/4 | | | |
| 28 | NPDEA(5) | 2/3 | 0 | | not tested | |
| 29 | NPDEA(2) | | 1/1 | | | |
| 30 | 1:1 BZ/AN(8.5) (Resin B)[g] | | 5/5 | 3/5 | 2/3 | 0 |
| 31 | 1:1 BZ/AN(8.5) (Resin B)[g] | 4/5 | 3/4 | | 3/3 | 2/3 |

Footnotes:
[c]BD = 1,3-butylene glycol
AC = acetanilide
UN = UNIPLEX 171 = 70/30 para/ortho toluenesulfonamide;
UNIPLEX 214 = N-butyl benzenesulfonamide;
UNIPLEX 225 = N-hydroxypropyl benzenesulfonamide (Products of Unitex Chemical Corp.)
AN = anisyl alcohol
BZ₂O = dibenzyl ether
TMPAE — trimethylolpropane allyl ether
AGE = allyl glycidyl ether
NPDEA = N-phenyldiethanolamine
BZ = benzyl alcohol
[d]weight % based on resin listed in parenthesis
[e]number in denominator represent test specimens, number in numerator represents specimens passing the designated impact round.
[f]formulated from potassium hydroxide catalyzed Resin C.
[g]formulated from plant produced Resin B.

The Table 13 data shows systems not containing anisyl alcohol that performed at least equivalent to Resin A after the 80≅100° C. post cure and showed promise after the 125° C. post cure. These systems included the binaries 1,3-butylene glycol (BD)/acetanilide, BD-UNIPLEX 214 (or 225), BD/dibenzyl ether, dibenzyl ether/UNIPLEX 214, and allyl glycidyl ether alone.

In view of the above, it should be apparent that many modifications may be made to the above disclosed embodiments while remaining within the spirit and scope of the present invention. Thus, the present invention is described not by the foregoing description, but by the claims appended hereto.

What is claimed is:

1. A composition for improving impact resistance and flexibility of acid hardenable phenolic resole resin comprising:

(a) an acid hardenable phenolic resole resin;

(b) about 5 to about 15% by weight of at least one additive selected from the group consisting of:

substituted benzylic alcohol having the Formula I:

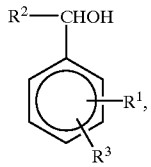

wherein $R^1$ is independently selected from the group consisting of H, all having 1 to 4 carbon atoms, and alkoxy having 1 to 4 carbon atoms, $R^2$ is selected from the group consisting of H and alkyl having 1 to 4 carbon atoms, $R^3$ is a moiety of formula —$OR^4$ wherein $R^4$ is selected from alkyl having 1 to 4 carbon atoms and aryl having 6 to 7 carbon atoms, wherein $R^1$, $R^2$ and $R^3$ are not simultaneously H;

benzylic ether having the Formula III:

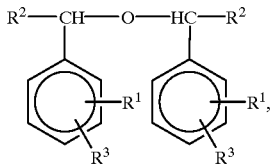

wherein each $R^1$, each $R^2$ and each $R^3$ are independently H or defined as in Formula I, 1,3-butylene glycol, monoallyl or methylallyl ethers of poly(methylol)alkanes, monoallyl ether of glycerine, allyl or methylallyl glycidyl ether, N-acylated naphthylamnine, and N-substituted arylsulfonamide; and (c) a hardening agent selected from the group consisting of organic acid, mineral acid, latent acid, and mixtures thereof.

2. The composition of claim 1, wherein the hardening agent comprises at least one member of the group consisting of aryl phosphite, an acid salt of a primary amine, an acid salt of a secondary amine, a partial phosphate ester, organic acid and a mineral acid, wherein the aryl phosphite has the Formula IV:

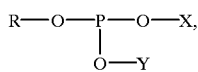

wherein each of R and X is selected from the group consisting of aryl of 6 to 12 carbon atoms and arylalkyl, and Y is a member selected from the group consisting of hydrogen, aryl of 6 to 12 carbon atoms, alkyl of 1 to 12 carbon atoms, and arylalkyl.

3. The composition of claim 1, wherein the additive is alcohol having a formula selected from the group consisting of Formula II, Formula IIA and mixtures thereof, Formula II is:

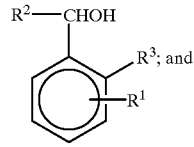

Formula IIA is:

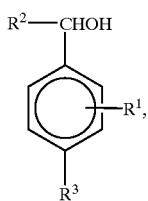

wherein $R^1$ and $R^2$ are selected from the group consisting of H and $CH_3$, and $R^3$ is selected from —$OR^4$, wherein $R^4$ is selected from the group consisting of $C_1$–$C_4$ alkyl and $C_6$–$C_7$ aryl.

4. The composition of claim 1, wherein the phenolic resin further comprises a novolac resin.

5. The composition of claim 3, wherein $R^1$ and $R^2$ are independently selected from the group consisting of H and $CH_3$, $R^4$ is $C_1$–$C_4$ alkyl and the alcohol has the Formula IIA.

6. The composition of claim 1, wherein the additive is selected from the group consisting of a mixture of 1,3-butylene glycol and acetanilide, a mixture of 1,3-butylene glycol and N-butyl benzenesulfonamide, a mixture of 1,3-butylene glycol and N-hydroxypropyl benzenesulfonamide, a mixture of 1-3-butylene glycol and dibenzyl ether, a mixture of dibenzyl ether and N-butyl benzenesulfonamide, and allyl glycidyl ether.

7. The composition of claim 1, wherein the additive is selected from the group consisting of:

benzylic ether having the Formula III:

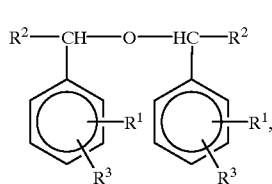

wherein each $R^1$, each $R^2$ and each $R^3$ are independently H or defined as in Formula I, 1,3-butylene glycol, monoallyl or methylallyl ethers of poly(methylol)alkanes, monoallyl ether of glycerine, allyl or methylallyl glycidyl ether, N-acylated naphthylamine, and N-substituted arylsulfonamide.

8. The composition of claim 1, wherein the additive is anisyl alcohol.

9. The composition of claim 1, further comprising benzyl alcohol, wherein the additive is anisyl alcohol.

10. The composition of claim 1, wherein the additive is dibenzyl ether.

11. The composition of claim 2, wherein the hardening agent is selected from the aryl phosphite, wherein each of R and X is independently selected from the group consisting of phenyl, p-cresyl, m-cresyl, and arylalkyl, and Y is selected from the group consisting of hydrogen, aryl of 6 to 12 carbon atoms, alkyl of 1 to 12 carbon atoms, and arylalkyl, and the resin is a resole resin.

12. The composition of claim 1, further comprising at least one nitrogen-containing compound selected from the group consisting of urea, ethylene urea, formamide, N-methyl-2-pyrrolidinone, and N-vinyl-2-pyrrolidinone.

13. The composition of claim 1, further comprising an epoxy resin comprising at least one member of the group consisting of linear terminal epoxy moieties, linear internal epoxy moieties, and cycloaliphatic epoxy moieties, wherein about 1 to about 20 weight percent of the composition is the epoxy resin.

14. A method for modifying a phenolic resole resin which comprises contacting:

(a) a phenolic resole resin which is acid hardenable; with (b) about 5 to about 15% by weight of at least one additive selected from the group consisting of:

substituted benzylic alcohol having the Formula I:

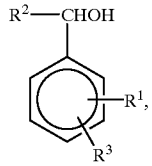

wherein $R^1$ is selected from the group consisting of H, alkyl having 1 to 4 carbon atoms, and alkoxy having 1 to 4 carbon atoms, $R^2$ is selected from the group consisting of H and alkyl having 1 to 4 carbon atoms, $R^3$ is a moiety of formula —$OR^4$ wherein $R^4$ is selected from alkyl having 1 to 4 carbon atoms and aryl having 6 or 7 carbon atoms, wherein $R^1$, $R^2$, and $R^3$ are not simultaneously H; and benzylic ether having the Formula III:

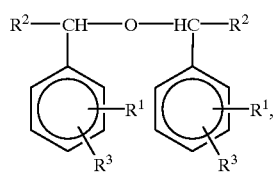

wherein each $R^1$, each $R^2$ and each $R^3$ are independently H or defined as in Formula I, 1,3-butylene glycol, monoallyl or methylallyl ethers of poly(methylol)alkanes, monoallyl ether of glycerine, allyl or methylallyl glycidyl ether, N-acylated naphthylamine, and N-substituted arylsulfonamide; and (c) a hardening agent selected from the group consisting of organic acid, mineral acid, latent acid, and mixtures thereof.

15. The method of claim 14, wherein the hardening agent comprises at least one member of the group consisting of an aryl phosphite, an acid salt of a primary amine, an acid salt of a secondary amine, a partial phosphate ester, an organic acid, and a mineral acid, wherein the aryl phosphite has the Formula IV:

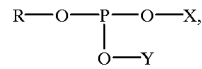

wherein each of R and X is a member selected from the group consisting of aryl of 6 to 12 carbon atoms and arylalkyl, and Y is a member selected from the group consisting of hydrogen, aryl of 6 to 12 carbon atoms, alkyl of 1 to 12 carbon atoms, and arylalkyl.

16. The method of claim 14 wherein the alcohol has a formula selected from the group consisting of Formula II, Formula IIA and mixtures thereof, Formula II is:

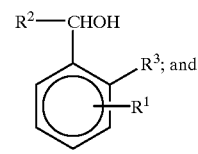

Formula IIA is

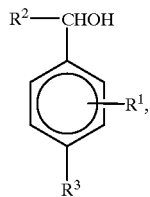

wherein $R^1$ and $R^2$ are independently selected from the group consisting of H and $CH_3$, and $R^3$ is selected from —$OR^4$, wherein $R^4$ is selected from the group consisting of $C_1$–$C_4$ alkyl and $C_6$–$C_7$ aryl.

17. The method of claim 14, wherein the phenolic resin further comprises a novolac resin.

18. The method of claim 14, wherein the additive is selected from the group consisting of benzylic ether having the Formula III:

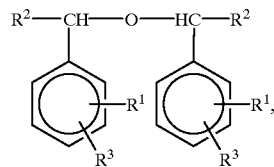

wherein each $R^1$, each $R^2$ and each $R^3$ are independently H or defined as in Formula I, 1,3-butylene glycol, monoallyl or methylallyl ethers of poly(methylol)alkanes, monoallyl ether of glycerine, allyl or methylallyl glycidyl ether, N-acylated naphthylamine, and N-substituted arylsulfonamide.

19. The method of claim 14, wherein the additive is selected from the group consisting of a mixture of 1,3-butylene glycol and acetanilide, a mixture of 1,3-butylene glycol and N-butyl benzenesulfonamide, a mixture of 1,3-butylene glycol and N-hydroxypropyl benzenesulfonamide, a mixture of 1,3-butylene glycol and dibenzyl ether, a mixture of dibenzyl ether and N-butyl benzenesulfonamide, and allyl glycidyl ether.

20. The method of claim 14, wherein the additive is anisyl alcohol.

21. The method of claim 14, further comprising contacting the phenolic resin with benzyl alcohol, wherein the additive is anisyl alcohol.

22. The method of claim 14, wherein the additive is dibenzyl ether.

23. A method of modifying a phenolic novolac resin comprising the steps of:

contacting the phenolic novolac resin and at least one additive selected from the group consisting of a substituted benzylic alcohol of Formula I:

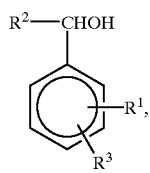

I wherein $R^1$ is selected from the group consisting of H, alkyl having 1 to 4 carbon atoms, and alkoxy having 1 to 4 carbon atoms, $R^2$ is selected from the group consisting of H and alkyl having 1 to 4 carbon atoms, $R^3$ is a moiety of formula —$OR^4$ wherein $R^4$ is selected from alkyl having 1 to 4 carbon atoms, and aryl having 6 or 7 carbon atoms, and benzylic ether having the Formula III:

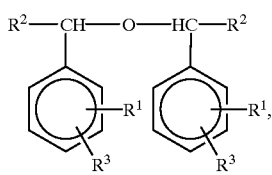

III wherein each $R^1$, each $R^2$ and each $R^3$ are independently H or defined as in Formula I, said contacting being in the presence of acid catalyst selected from the group consisting of organic acid, mineral acid, latent acid, and mixtures thereof to make a reaction mixture; and optionally reacting the acid catalyst by a step selected from the group consisting of at least partially neutralizing the catalyst and at least partially thermally decomposing the catalyst, thereby resulting in a modified novolac mixture.

24. The method of claim 23, further comprising curing the modified novolac mixture by addition of a curing agent and heating the mixture.

25. A method of modifying and curing a phenolic novolac resin comprising the steps of:

mixing the phenolic novolac resin, with at least one additive selected from the group consisting of a benzylic alcohol of Formula I:

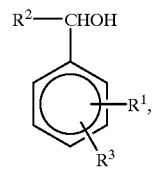

I wherein $R^1$ is independently selected from the group consisting of H, alkyl having 1 to 4 carbon atoms, and alkoxy having 1 to 4 carbon atoms, $R^2$ is selected from the group consisting of H and alkyl having 1 to 4 carbon atoms, $R^3$ is a moiety of formula —$OR^4$ wherein $R^4$ is selected from alkyl having 1 to 4 carbon atoms and aryl having 6 or 7 carbon atoms, and benzylic ether having the Formula III:

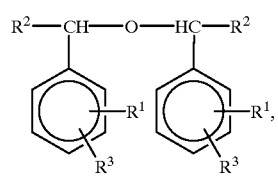

III wherein each $R^1$, each $R^2$ and each $R^3$ are independently H or defined as in Formula I;

an acid catalyst; and a curing agent selected from the group consisting of a latent formaldehyde source and a melamine resin to form a mixture; and heating the mixture at a temperature of about 100° C. to about 200° C.

26. A phenolic novolac resin made according to the method of claim 23.

27. A cured phenolic novolac resin made according to the method of claim 25.

28. A shaped article comprising a mixture of a composition of claim 1, and a filler selected from at least one member of the group consisting of particles and fibers and the filler is made of at least one substance selected from the group consisting of inorganic material, organic material, ceramic material and metallic material.

29. The shaped article of claim 28, further comprising at least one silane coupling agent.

30. The shaped article of claim 28, wherein the particles are aggregate selected from the group consisting of glass particles, mineral particles, ceramic particles, and organic particles.

31. The shaped article of claim 30, wherein the particles are glass microspheres, ceramic microspheres and phenolic novolac microspheres.

32. The shaped article of claim 30, wherein the fibers are selected from the group consisting of glass fibers, ceramic fibers, polymer fibers, asbestos fibers, metal fibers, and graphite fibers.

33. A method to increase mix life of acid hardenable phenolic resole resin comprising the steps of:

reacting at least one aryl phosphite with at least one additive to form a reaction mixture; and subsequently mixing the reaction mixture with the resin;

wherein the additive is selected from the group consisting of a substituted benzylic alcohol having a Formula I:

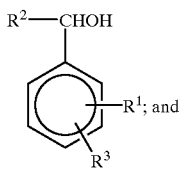

wherein R¹ is independently selected from the group consisting of H, allyl having 1 to 4 carbon atoms, and alkoxy having 1 to 4 carbon atoms, R² is selected from the group consisting of H and alkyl having 1 to 4 carbon atoms, R³ is a moiety of formula —OR⁴ wherein R⁴ is selected from alkyl having 1 to 4 carbon atoms and aryl having 6 or 7 carbon atoms, and the aryl phosphite has a Formula IV,

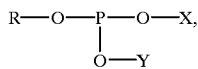

wherein each of R and X is aryl of 6 to 12 carbon atoms, and Y is a member selected from the group consisting of hydrogen, aryl of 6 to 12 carbon atoms, alkyl of 1 to 12 carbon atoms, and arylalkyl, the phosphite being in an amount sufficient on hydrolysis thereof to harden the resin.

34. A composition made by the method of claim 23 wherein the composition consists essentially of phenolic novolac resin modified by the additive.

35. A composition made by the method of claim 25, wherein the composition consists essentially of phenolic novolac resin modified by the additive.

36. The composition of claim 10, further comprising benzyl alcohol.

37. The method of claim 22, further comprising contacting the phenolic resin with benzyl alcohol.

38. The composition of claim 1, further comprising N-acylated arylamine or N-substituted arylamine.

39. The composition of claim 1, further comprising benzyl alcohol.

40. The composition of claim 1, wherein the additive is anisyl alcohol and dibenzyl ether.

41. The method of claim 14, further comprising N-acylated arylamine or N-substituted arylamine.

42. The method of claim 14, further comprising benzyl alcohol.

43. The method of claim 14, wherein the additive is anisyl alcohol and dibenzyl ether.

* * * * *